(12) United States Patent
Seo

(10) Patent No.: US 12,160,651 B2
(45) Date of Patent: Dec. 3, 2024

(54) LENS ASSEMBLY AND ELECTRONIC DEVICE INCLUDING THE SAME

(71) Applicant: Samsung Electronics Co., Ltd., Gyeonggi-do (KR)

(72) Inventor: Jungpa Seo, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/368,090

(22) Filed: Sep. 14, 2023

(65) Prior Publication Data

US 2024/0056667 A1    Feb. 15, 2024

Related U.S. Application Data

(63) Continuation of application No. PCT/KR2023/003626, filed on Mar. 17, 2023, and a
(Continued)

(30) Foreign Application Priority Data

May 27, 2022   (KR) .................. 10-2022-0065160
Sep. 30, 2022   (KR) .................. 10-2022-0125780
Mar. 3, 2023    (KR) .................. 10-2023-0028763

(51) Int. Cl.
   *H04N 23/55*    (2023.01)
   *G02B 13/00*    (2006.01)
   *H04N 23/54*    (2023.01)

(52) U.S. Cl.
   CPC .......... *H04N 23/55* (2023.01); *G02B 13/0045* (2013.01); *H04N 23/54* (2023.01)

(58) Field of Classification Search
   CPC ..... H04N 23/55; H04N 23/54; G02B 13/0045
   (Continued)

(56) References Cited

U.S. PATENT DOCUMENTS

2012/0206818 A1   8/2012   Shim
2015/0253647 A1   9/2015   Mercado
(Continued)

FOREIGN PATENT DOCUMENTS

JP    2017-32969 A    2/2017
JP    2021-32959 A    3/2021
(Continued)

OTHER PUBLICATIONS

International Search Report dated Aug. 31, 2023.

*Primary Examiner* — Joel W Fosselman
(74) *Attorney, Agent, or Firm* — Cha & Reiter, LLC

(57) ABSTRACT

An electronic device and a camera assembly are disclosed. The electronic device may include the camera assembly, which in turn may include a lens assembly having at least four lenses, an image sensor, and at least one reflective member that refracts or reflects incident light at least twice, wherein at least one surface of an object-side surface and an image-side surface of a first lens from an object side among the at least four lenses is formed as an aspherical surface, wherein the object-side surface and the image-side surface are formed to be convex, wherein various conditional equations stipulation relationships between back focal length (BFL), effective focal length (EFL) and field-of-view (FOV) are satisfied.

20 Claims, 18 Drawing Sheets

Related U.S. Application Data continuation of application No. 18/122,790, filed on Mar. 17, 2023, now Pat. No. 11,785,324.

(58) Field of Classification Search
USPC .......................................................... 348/335
See application file for complete search history.

(56) References Cited

U.S. PATENT DOCUMENTS

| | | |
|---|---|---|
| 2017/0038564 A1 | 2/2017 | Kuo et al. |
| 2017/0276912 A1 | 9/2017 | Yao et al. |
| 2017/0359568 A1 | 12/2017 | Georgiev et al. |
| 2019/0056566 A1 | 2/2019 | Yoo et al. |
| 2019/0196148 A1 | 6/2019 | Yao et al. |
| 2019/0243112 A1 | 8/2019 | Yao et al. |
| 2020/0150387 A1 | 5/2020 | Kim et al. |
| 2021/0072511 A1 | 3/2021 | Jo et al. |
| 2022/0091373 A1 | 3/2022 | Saiga et al. |
| 2022/0113520 A1 | 4/2022 | Kim et al. |
| 2022/0137363 A1 | 5/2022 | Shin et al. |
| 2023/0204906 A1 | 6/2023 | Lim et al. |

FOREIGN PATENT DOCUMENTS

| | | | |
|---|---|---|---|
| JP | 2021032959 | * | 3/2021 |
| KR | 10-2008-0105728 A | | 12/2008 |
| KR | 10-2012-0092419 A | | 8/2012 |
| KR | 10-2016-0076341 A | | 6/2016 |
| KR | 10-2018-0107181 A | | 10/2018 |
| KR | 10-2019-0020421 A | | 3/2019 |
| KR | 10-2019-0035634 A | | 4/2019 |
| KR | 10-2020-0055944 A | | 5/2020 |
| KR | 10-2021-0064142 A | | 6/2021 |
| KR | 10-2334584 B1 | | 12/2021 |
| KR | 10-2022-0048525 A | | 4/2022 |
| KR | 10-2022-0059012 A | | 5/2022 |
| KR | 10-2023-0100342 A | | 7/2023 |

* cited by examiner

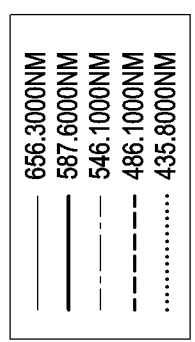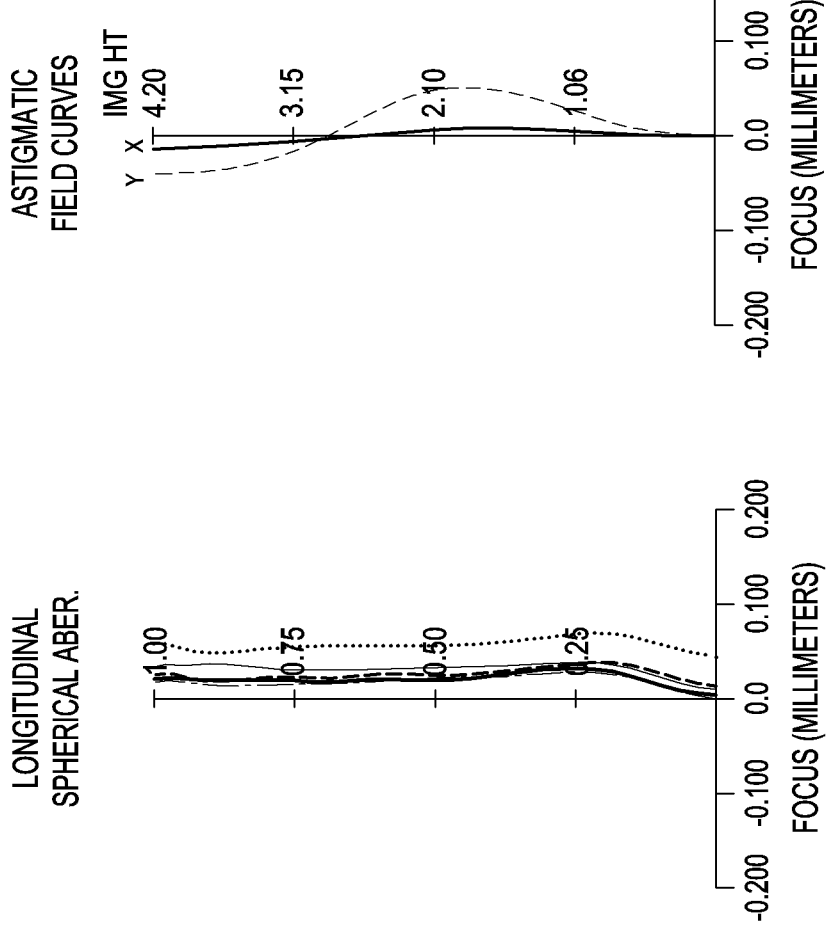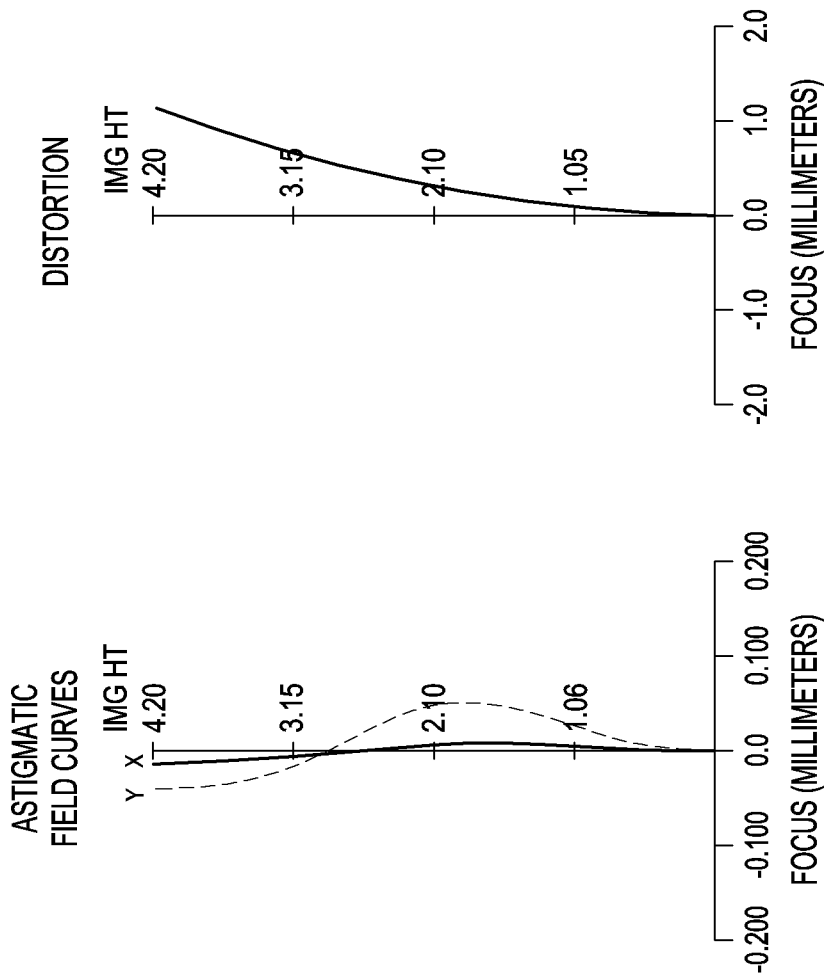
FIG. 8A  FIG. 8B  FIG. 8C

LENS ASSEMBLY AND ELECTRONIC DEVICE INCLUDING THE SAME

CROSS-REFERENCE TO RELATED APPLICATIONS

This application is a continuation of U.S. patent application Ser. No. 18/122,790 filed on Mar. 17, 2023 which claims priority under 35 U.S.C. § 120 to PCT International Application No. PCT/KR2023/003626 designating the United States, filed on Mar. 17, 2023 in the Korean Intellectual Property Receiving Office and claiming priority to Korean patent application No. 10-2022-0065160, filed on May 27, 2022, Korean patent application No. 10-2022-0125780 filed on Sep. 30, 2022, and Korean patent application No. 10-2023-0028763 filed on Mar. 3, 2023 in the Korean Intellectual Property Office, the disclosures of all of which are incorporated by reference herein in their entireties.

TECHNICAL FIELD

Various embodiments of the disclosure relate to a lens assembly and, more specifically, to a lens assembly including a curved optical system and an electronic device including the same.

BACKGROUND

As limits are imposed on the total length (e.g., the overall length and/or height along the optical axis) of compact electronic devices, such as portable terminals, it may be difficult to provide a sufficient telephoto ratio for implementing the normal functionality of a telephoto lens. Here, the imposed limits may signify that the number of lenses included in a lens assembly are limited. The limit in the number of lenses included in the lens assembly may render it difficult to obtain high-quality images and/or videos. With a limited number of lenses alone, it may be difficult to manufacture a lens assembly with a low F-number and small aberration.

SUMMARY

To overcome the shortcomings, techniques are sometimes proposed for receiving a lens assembly capable of securing a sufficient telephoto ratio in an electronic device, by forming a folded optical system configured to reflect or refract the light path at least twice, by disposed a reflective member (e.g., a mirror or prism) before the lens assembly.

In the folded optical system, two reflective members are placed before/after and placing a lens assembly between the two reflective members. There may also be a method for disposing a reflective member between a lens assembly and an image sensor. In the former case, as the lens assembly is disposed between two reflective members, it may introduce limitations on increasing the module size, and furthermore, it may be difficult to ensure alignment along the optical path and to manufacture low F-number optical systems. In contrast, in the latter case, since the reflective member is disposed between the lens assembly and the image sensor, the lens assembly may be separated from the reflective member. Accordingly, in the latter case, it may be easier to manufacture low F-number optical systems than in the former case. Further, the latter case may provide more ease of light path alignment than the latter case. Further, the latter case may provide more ease of module size adjustment than the latter case.

The above-described information may be provided as background for the purpose of helping understanding of the disclosure. No claim or determination is made as to whether any of the foregoing is applicable as background art in relation to the disclosure.

According to an embodiment of the disclosure, an electronic device is disclosed, including: a lens assembly in which at least four lenses are aligned along an optical axis in a direction from an object side to an image side, an image sensor including an imaging plane on which an image is formed, at least one reflective member disposed between the lens assembly and the image sensor, wherein the reflective member is configured to refract or reflect light at least twice, wherein at least one surface of an object-side surface and an image-side surface of a first lens from an object side among the at least four lenses is formed as an aspherical surface, wherein the object-side surface and the image-side surface are formed to be convex, and wherein the electronic device satisfies conditional equation 1 and conditional equation 2 as set forth below:

$0.6 < BFL/EFL < 1.1$      [conditional equation 1]

$15 < FOV < 35$, and      [conditional equation 2]

wherein, in conditional equation 1, BFL is a "back focal length," indicating distance from an image-side surface of a lens closest to the imaging plane to the image sensor, and EFL is an "effective focal length," indicating a total focal length of the lens assembly and, in conditional equation 2, FOV is a field of view of an overall optical system including the lens assembly.

According to an embodiment of the disclosure, an electronic device is disclosed, including: a lens assembly in which at least four lenses are aligned along an optical axis in a direction from an object side to an image side, an image sensor including an imaging plane where an image is formed, at least one reflective member disposed between the lens assembly and the image sensor, wherein the at least one reflective member is configured to change a path of light at least twice, wherein a path of a chief ray passing through the at least one reflective member is parallel to a path of a chief ray incident on the lens assembly, wherein the electronic device satisfies conditional equation 1 and conditional equation 2 below:

$0.6 < BFL/EFL < 1.1$      [conditional equation 1]

$15 < FOV < 35$, and      [conditional equation 2]

wherein, in conditional equation 1, BFL is a "back focal length" indicating a distance from an image-side surface of a lens closest to the imaging plane to the image sensor, and EFL is an "effective focal length," indicating total focal length of the lens assembly and, in conditional equation 2, FOV is a field of view of an overall optical system including the lens assembly.

BRIEF DESCRIPTION OF THE DRAWINGS

FIG. 8A is a graph illustrating the spherical aberration of the lens assembly of FIG. 7;

FIG. 8B is a graph illustrating astigmatism of the lens assembly of FIG. 7;

FIG. 8C is a graph illustrating the distortion of the lens assembly of FIG. 7;

DETAILED DESCRIPTION

In a folded optical system, dispose the reflective member between the lens assembly and the image sensor may present difficulties in terms of controlling aberration and sensitivity of the optical system, depending on the number of lenses and materials used for the lens assembly.

For example, a lens assembly including a certain number (e.g., three or fewer) of lenses may experience difficulties with aberration control number as there may be insufficient lenses to correct aberration. Further, as the image size may be very small in a lens assembly having a relatively small number of lenses (e.g., three or fewer), it may be difficult to capture high-quality images. As an example, with glass lenses, a spherical shape may be used due to the additional weight, manufacturing cost, and manufacturing difficulty associated with producing glass lenses having an aspheric shape. For example, when the lens assembly includes a plurality of lenses arranged along the optical axis, if the first lens from the object side is formed of a spherical glass lens, the remaining lenses should be formed to have a curvature less than a particular curvature value, and if so, the sensitivity of the optical system may be increased.

According to the disclosure, there are provided various embodiments of the present disclosure provide a shape and material for a lens, to thereby permit implementation of a space-efficient camera module while maintaining a sufficient number of lenses, formed using adequate materials, so as to effectively control aberration and sensitivity.

Figure 1:
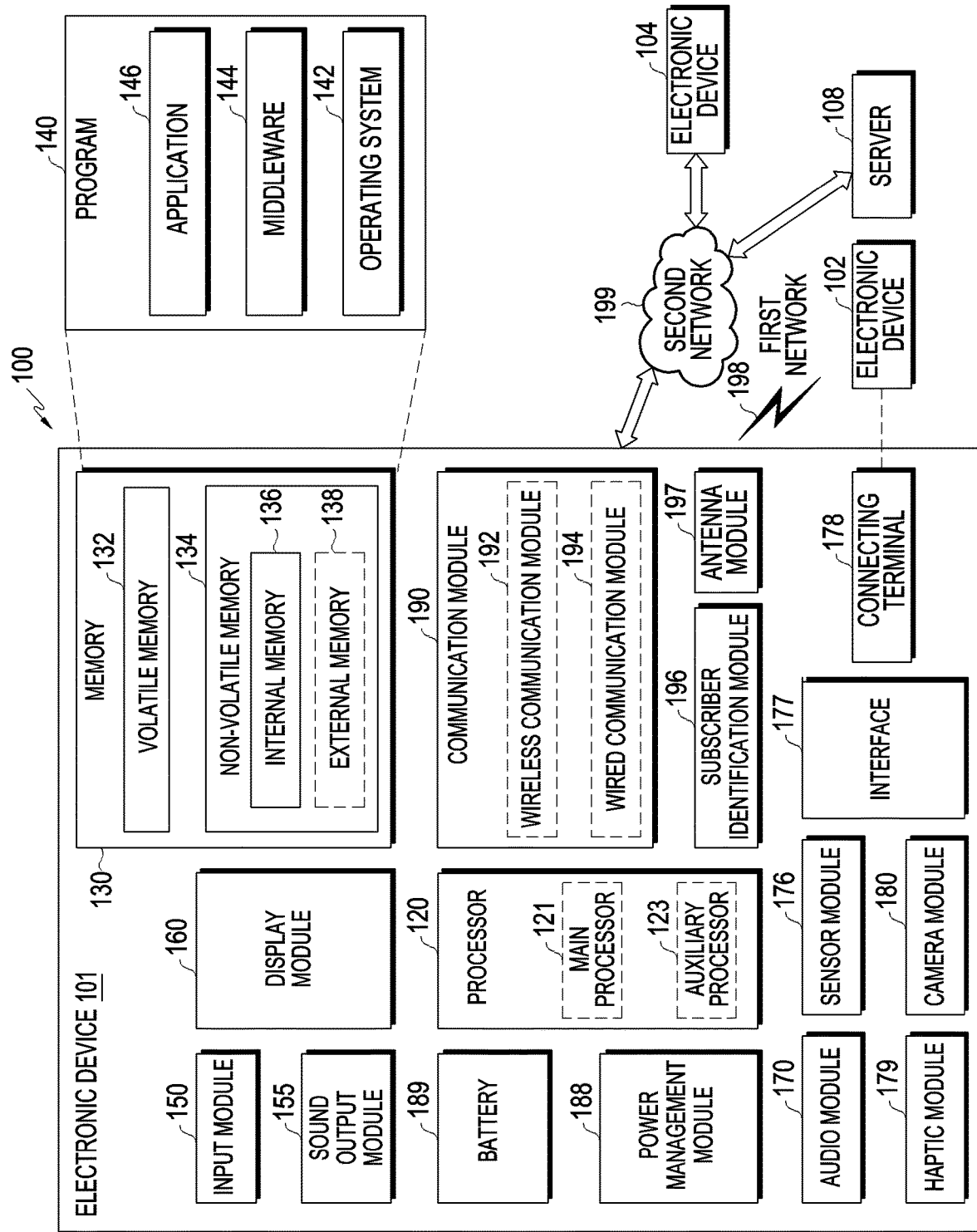
FIG. 1 is a view illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
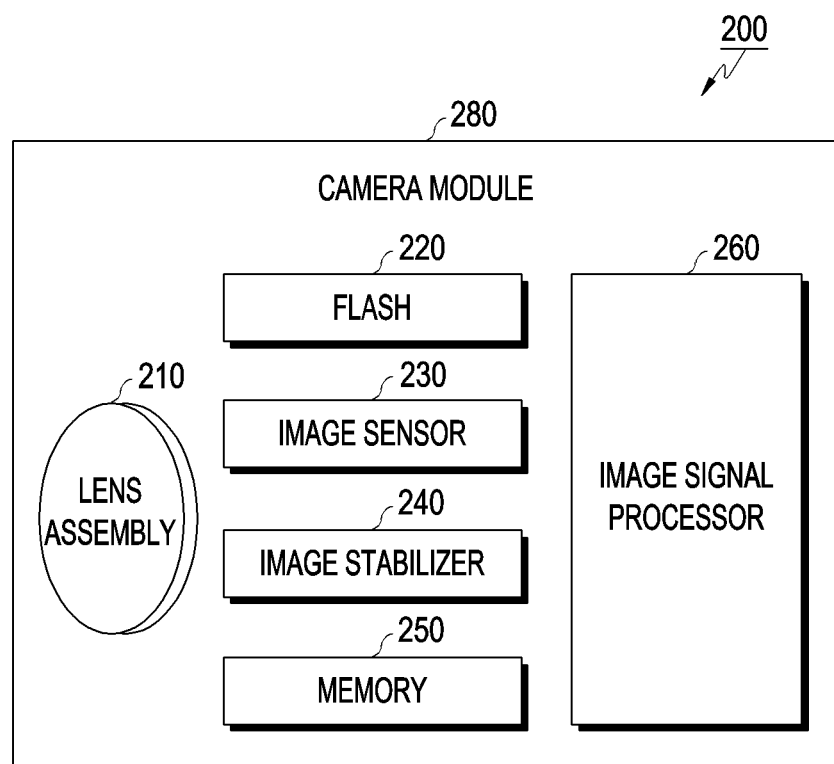
FIG. 2 is a block diagram illustrating a camera module according to various embodiments.

FIG. 2 is a block diagram 200 illustrating the camera module 280 according to various embodiments. Referring to FIG. 2, the camera module 280 may include a lens assembly 210, a flash 220, an image sensor 230, an image stabilizer 240, memory 250 (e.g., buffer memory (e.g., the memory 130 of FIG. 1)), or an image signal processor 260. The lens assembly 210 may collect light emitted or reflected from an object whose image is to be taken. The lens assembly 210 may include one or more lenses. According to an embodiment, the camera module 280 may include a plurality of lens assemblies 210. In such a case, the camera module 280 may form, for example, a dual camera, a 360-degree camera, or a spherical camera. Some of the plurality of lens assemblies 210 may have the same lens attribute (e.g., view angle, focal length, auto-focusing, f number (Fno), or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing of the image sensor 230 in response to the movement of the camera module 280 or the electronic device 101 including the camera module 180. This allows compensating for at least part of a negative effect (e.g., image blurring) by the movement on an image being captured. According to an embodiment, the image stabilizer 240 may sense such a movement by the camera module 280 or the electronic device 101 using a gyro sensor (not shown) or an acceleration sensor (not shown) disposed inside or outside the camera module 280. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 250 or as a separate memory that is operated independently from the memory.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 280. An image processed by the image signal processor 260 may be stored back in the memory 250 for further processing, or may be provided to an external component (e.g., the memory 130, the display module 160, the electronic device 102, the electronic device 104, or the server 108) outside the camera module 280. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module (e.g., 160 of FIG. 1) as it is or after being further processed.

According to an embodiment, the electronic device 101 may include a plurality of camera modules 280 having different attributes or functions. In such a case, at least one of the plurality of camera modules 280 may form, for example, a wide-angle camera and at least another of the plurality of camera modules 180 may form a telephoto camera. Similarly, at least one of the plurality of camera modules 280 may form, for example, a front camera and at least another of the plurality of camera modules 180 may form a rear camera.

According to various embodiments, representative examples of the electronic device 101 may include optical devices (e.g., camera modules), and the following description may be based on the hypothesis that a lens assembly is equipped in an optical device according to an embodiment.

Although limits or limitations to some numbers may be proposed herein, it should be noted that various embodiments of the disclosure are not limited by such numbers as long as the numbers are not shown in the claims.

Figure 3A:
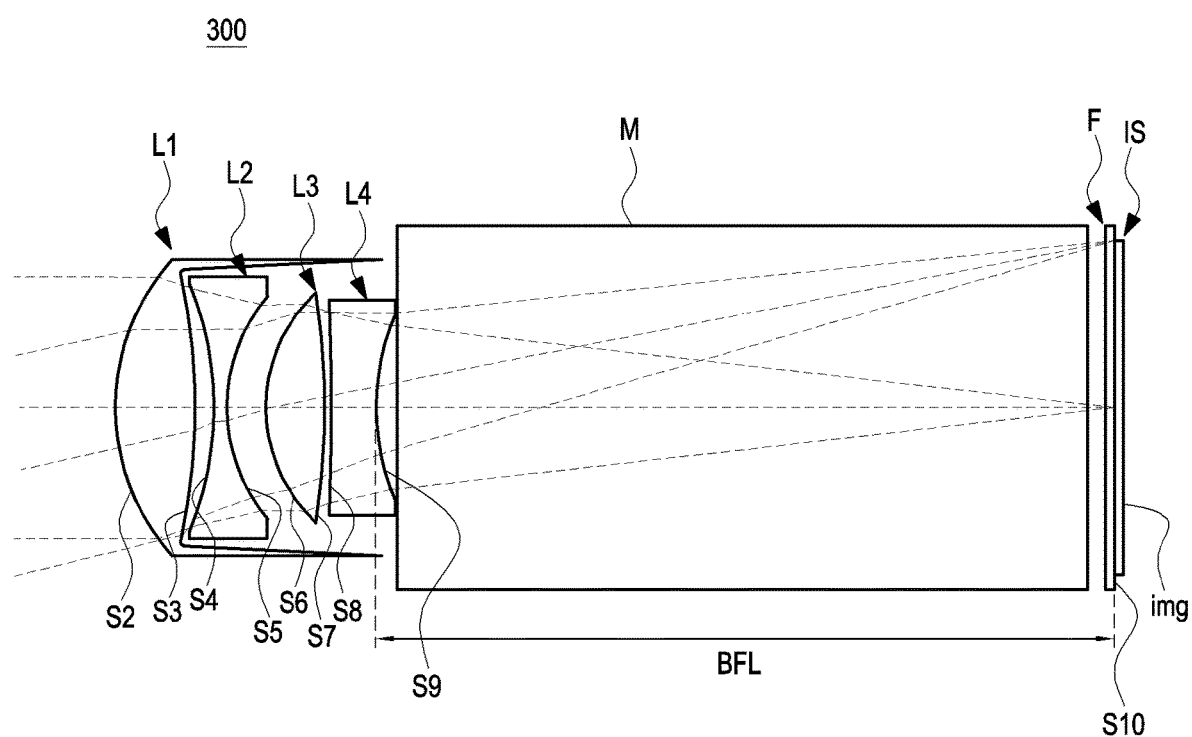
FIG. 3A is a view illustrating a configuration of a lens assembly according to an embodiment.
Figure 3B:
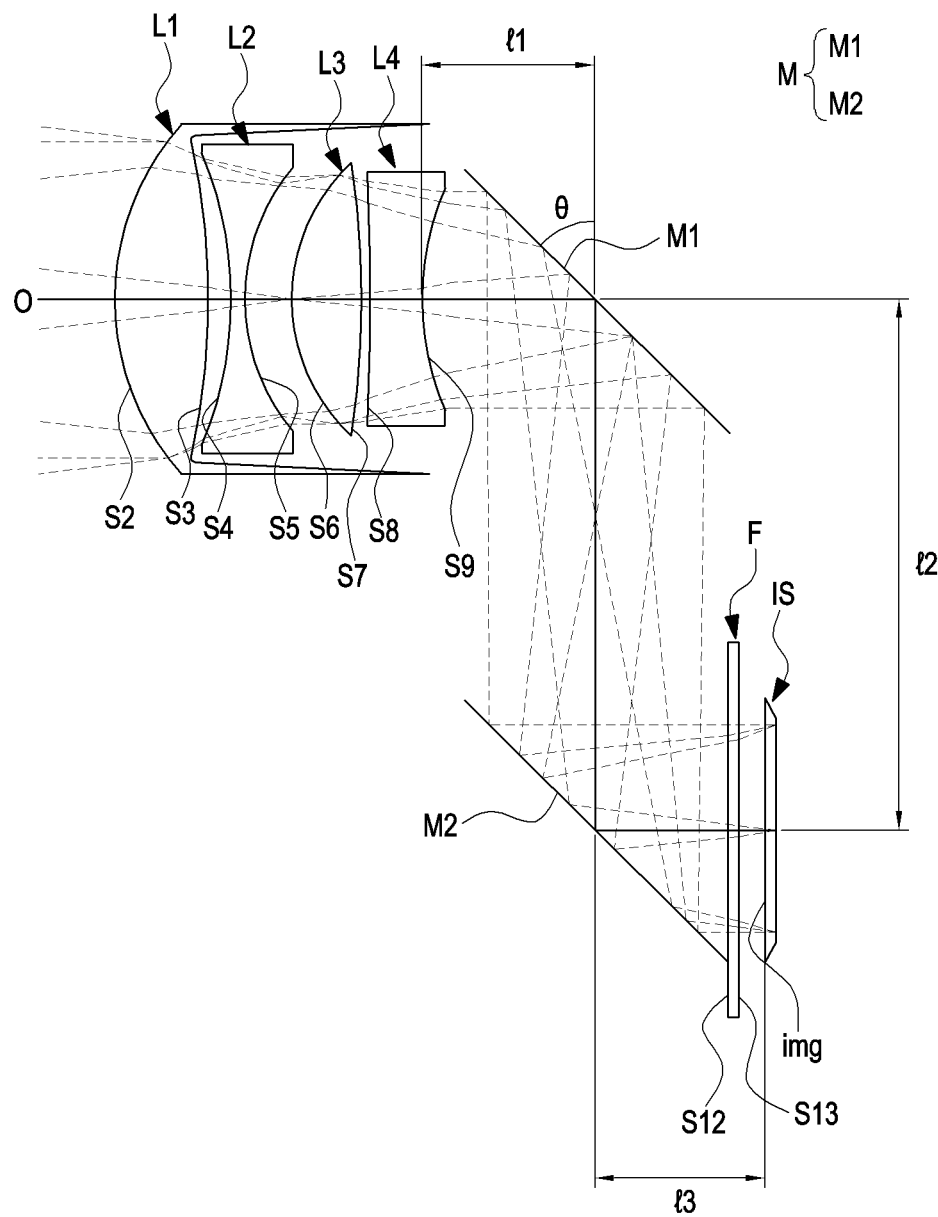
FIG. 3B is a view illustrating a configuration of an example of FIG. 3A.
Figure 3C:
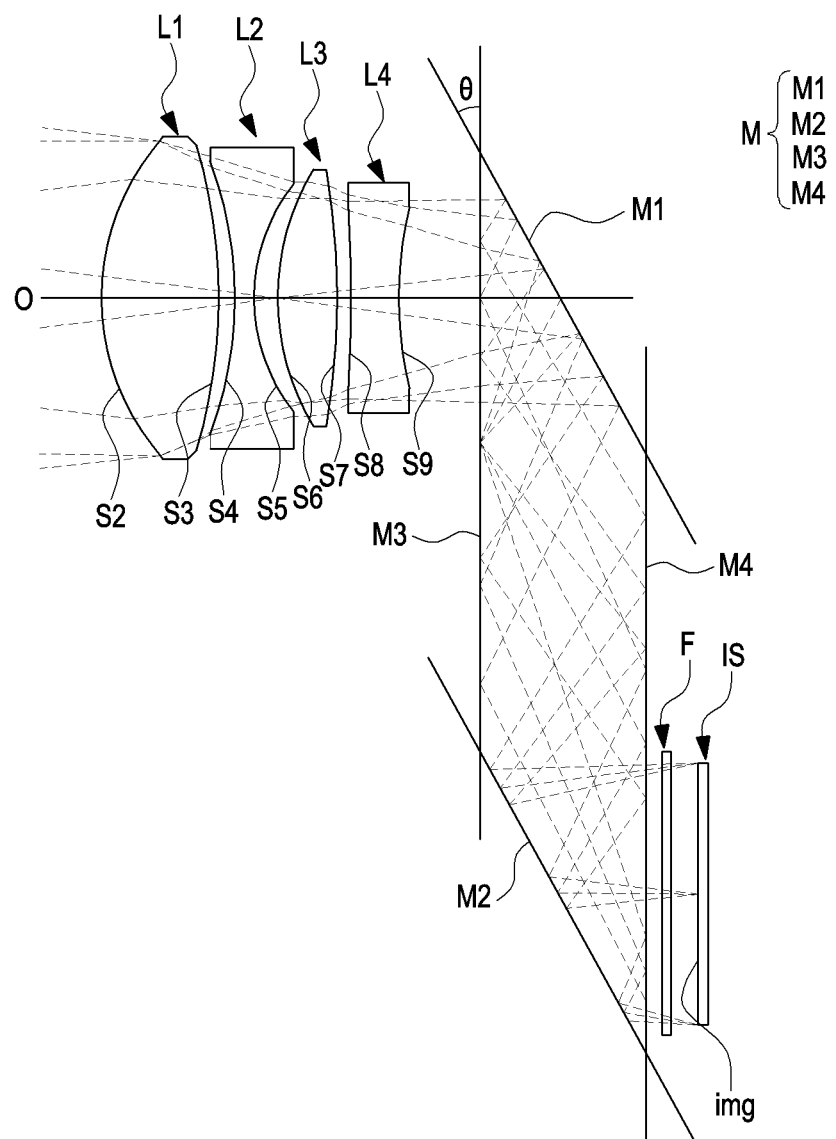
FIG. 3C is a view illustrating a configuration of an example of FIG. 3A.
Figure 4C:
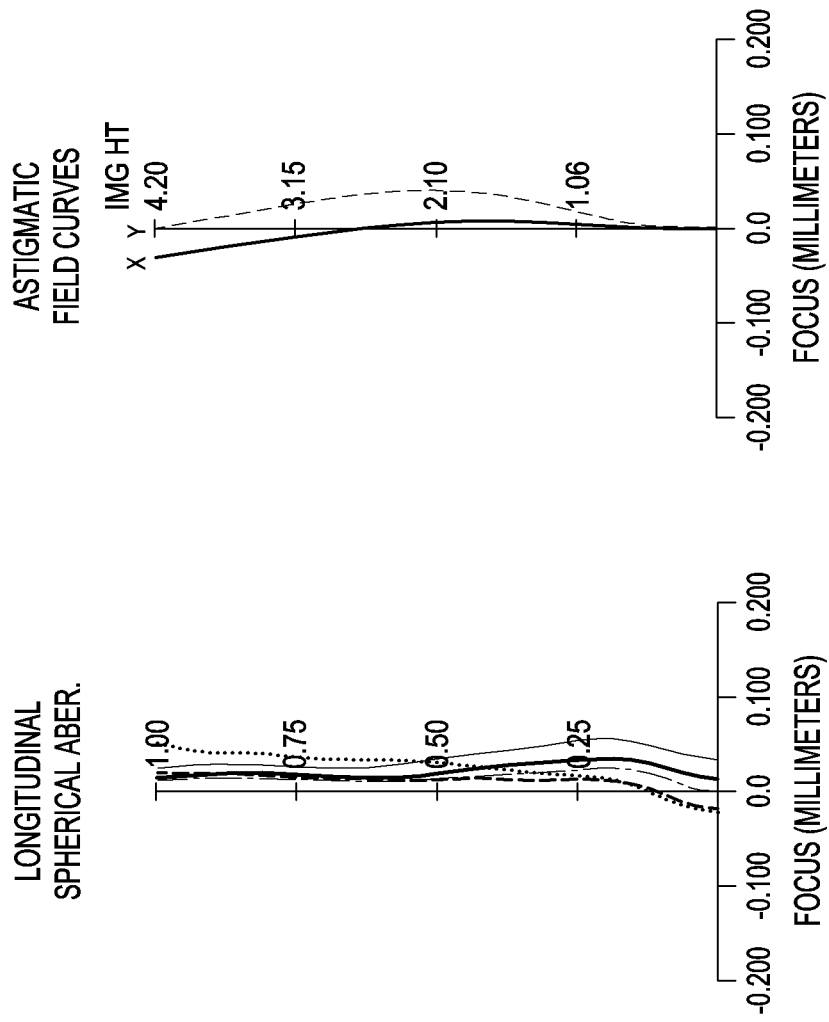
FIG. 4C is a graph illustrating the distortion of the lens assembly of FIG. 3A.
Figure 4B:
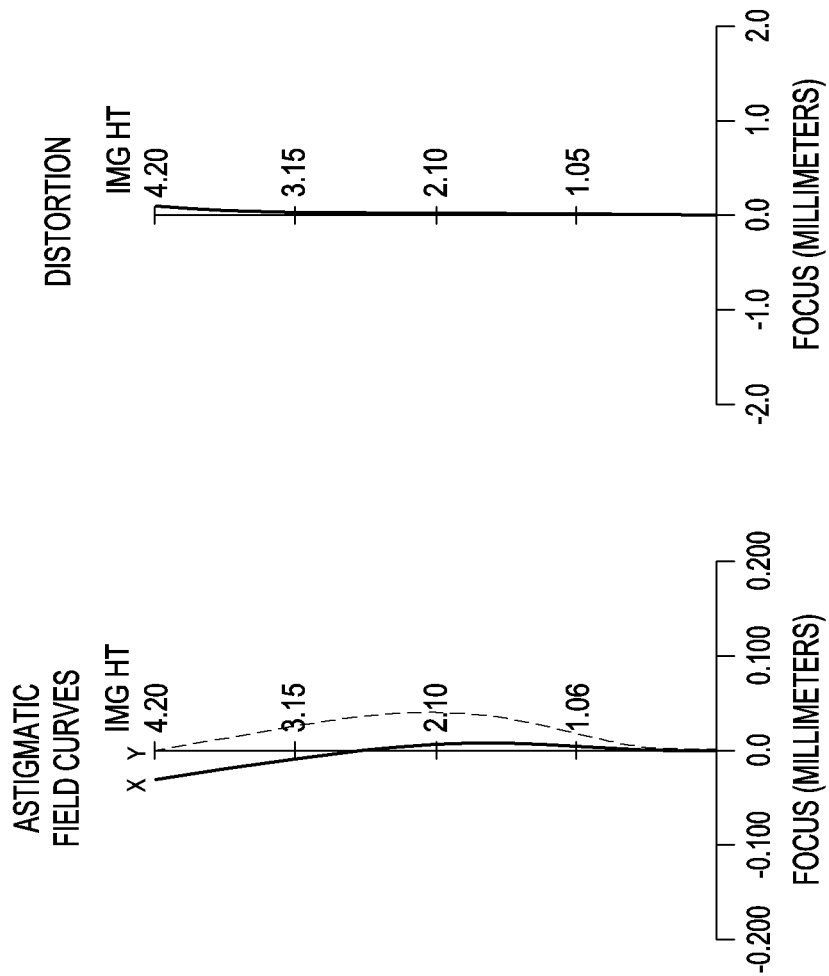
FIG. 4B is a graph illustrating astigmatism of the lens assembly of FIG. 3A.
Figure 4A:
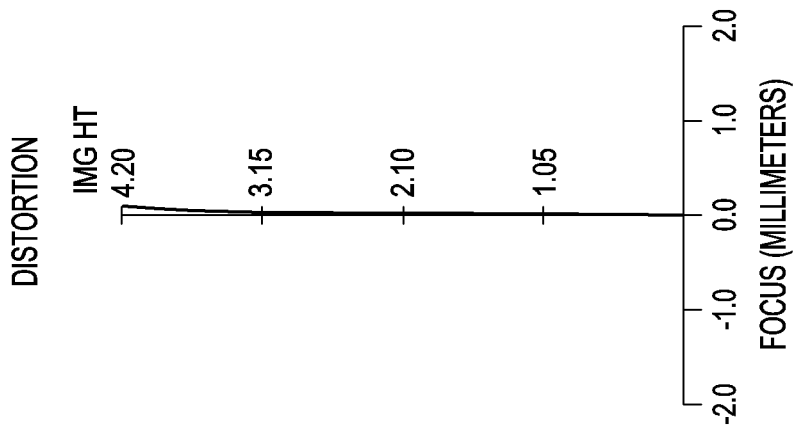
FIG. 4A is a graph illustrating the spherical aberration of the lens assembly of FIG. 3A.

FIG. 3A is a view illustrating a configuration of a lens assembly according to an embodiment. FIG. 3B is a view illustrating a configuration of an example of FIG. 3A. FIG. 3C is a view illustrating a configuration of an example of FIG. 3A. According to an embodiment, FIG. 3B and FIG. 3C illustrates a folded optical system including a reflective member M that refracts or reflects the light incident on the lens assembly, at least two times. FIG. 4A is a graph illustrating the spherical aberration of the lens assembly of FIG. 3A. FIG. 4B is a graph illustrating astigmatism of the lens assembly of FIG. 3A. FIG. 4C is a graph illustrating the distortion of the lens assembly of FIG. 3A.

Referring to FIG. 3A, according to one of various embodiments of the disclosure, a lens assembly may include a plurality of lenses and an image sensor.

According to various embodiments, an image sensor "IS" may be included in an electronic device. The lens assembly 300 including a plurality of lenses may be mounted in the optical device equipped along with the image sensor and/or the electronic device (e.g., the electronic device 101 of FIG. 1), thereby forming an optical system. The optical device may be, for example, a camera. The following description assumes that the lens assembly 300 is mounted in the optical device. The optical device may further include a housing that protects internal components, and forms an exterior, along with the optical system.

According to various embodiments, the image sensor IS may be mounted on a circuit board so as to be aligned with the optical axis, and may be responsive to light. The image sensor IS may include a complementary metal-oxide semiconductor (CMOS) or charge coupled device (CCD) sensor. The image sensor IS, however, is not limited thereto but may rather include various elements that convert light, e.g., an object image, into an electrical image signal. The image sensor IS may detect brightness, contrast ratio information, or color information about the object from the light which has been transmitted through the plurality of lenses, thereby obtaining an image for the object.

According to various embodiments of the disclosure, at least one of the plurality of lenses included in the lens assembly 300 may be formed of a synthetic resin (e.g., plastic). As the plurality of lenses included in the lens assembly 300 are manufactured using a synthetic resin (e.g., plastic) having a predetermined refractive index, the size or shape of the lens assembly may be more variable in design. As the plurality of lenses included in the lens assembly are manufactured using the synthetic resin (e.g., plastic) having a predetermined refractive index, it is possible to reduce a weight of the lens assembly and reduce associated manufacturing costs as well, as compared against lenses formed using a glass material. Further, when the first lens from the object side is formed using a glass material, the second and following lenses from the object side are more limited in terms shape due the first lens. Accordingly, the plurality of lenses included in the lens assembly 300 may be formed of a synthetic resin material, so as to enable a high degree of variability in freedom for lens design. Further, as the plurality of lenses included in the lens assembly 300 are formed of a synthetic resin material, this may provide advantages in weight reduction and miniaturization of the electronic device (e.g., the electronic device 101 of FIG. 1) in which the lens assembly 300 is mounted.

According to various embodiments, the lens assembly 300 may be disposed on the optical axis O-I passing through the centers of the plurality of lenses from the object (or external object) side to the image side. In describing the configuration of each lens below, 'object side' may denote the direction in which the object O is present, and 'image side' may denote the direction in which an imaging plane "img" where an image I is formed and otherwise present. The 'object side-facing surface' of a lens may denote a surface facing the object on the optical axis, which may indicate the left (or front) surface of the lens as viewed from above the drawings, and the 'image side-facing surface' of the lens may denote a surface facing towards the imaging plane "img" on the optical axis O-I, which may indicate the right (or rear) surface of the lens as viewed from above the drawings of the disclosure. The imaging plane "img" may be a portion where, e.g., an image capturing element or image sensor is disposed, and on which an image forms.

According to an embodiment, in describing the plurality of lenses, a portion of each lens closest to the optical axis O-I may be referred to as a chief portion, and the portion further from the optical axis (or disposed near an edge of the lens) may be referred to as a marginal portion. The chief portion may cross the optical axis in a certain lens (e.g., the first lens) and may have the chief ray among the rays of light incident on the lens assembly 300 pass therethrough. The marginal portion may be spaced apart from the optical axis by a predetermined distance. The marginal portion may include an end portion of the lens which is disposed farthest from the optical axis of the lens. Further, according to various embodiments of the disclosure, the light passing through the chief portion or the portion close to the chief portion may be referred to as a short axis light beam, and the light passing through the marginal portion may be referred to as a long axis light beam.

According to an embodiment, the radius of curvature, thickness, total length from imaging plane (TTL), and focal length of a lens may be described herein in terms of millimeters, unless stated otherwise. The thickness of a lens, the interval between lenses, or TTL may be a distance measured from the center of the optical axis of the lens. In describing the shape of a lens, 'one surface of the lens is convex' may indicate that the optical axis portion of the surface is convex, and 'one surface of the lens is concave' may indicate that the optical axis portion of the surface is concave. Thus, although one surface of a lens (e.g., the optical axis portion of the surface) is described as convex in shape, edge portions of the lens (e.g., portions set a predetermined distance apart from the optical axis portion of the surface) may be concave. Likewise, although one surface of a lens (e.g., the optical axis portion of the surface) is described as concave in shape, edge portions of the lens (e.g., portions a predetermined distance set apart from the optical axis portion of the surface) may be convex. As used herein, the term 'inflection point' may mean a point where the radius of curvature changes in a portion which does not cross the optical axis.

According to various embodiments of the disclosure, a lens assembly 300 may include at least four or more lenses. According to various embodiments, referring to FIG. 3A, the lens assembly 300 may include four lenses, as a plurality of lenses sequentially arranged in the optical axis direction (e.g., the direction from the object side to the image side of FIG. 3A). For example, the lens assembly 300 may include a first lens L1, a second lens L2, a third lens L3, and a fourth lens L4 sequentially arranged from the object side O to the image side I. However, it should be noted that the number of the lenses included in the lens assembly is not limited to the embodiment of FIG. 3A. An embodiment in which five lenses are included is disclosed below through an embodiment of FIGS. 5, 7, 9 and 11. The lens assembly 300 may include a reflective member M that may change the path of the light passing through the lens (e.g., the fourth lens L4 of FIGS. 3A 3B, 3C and 13, or the fifth lens L5 of FIGS. 5, 7, 9 and 11) closest to the image, at least two or more times. The lens assembly 300 may adopt a prism as the reflective member M. The reflective member M is described below in detail with reference to FIG. 3B and 3C.

According to various embodiments, the first lens (e.g., the first lens L1) disposed from the object side included in the lens assembly may have a positive (+) refractive power. If light parallel with the optical axis is incident onto the lens with a positive refractive power, the light, after passing through the lens, may be focused. For example, the lens with a positive refractive power may be a lens based on the principle of a convex lens. In contrast, if the parallel light is incident on the lens having a negative (−) refractive power, the light, after passing through the lens, may be dispersed. For example, the lens with a negative refractive power may be a lens based on the principle of a concave lens. For example, in the lens assembly of the disclosure, the lens (e.g., the second lens L2) disposed from the object side may have a negative refractive power.

According to various embodiments, the first lens (e.g., the first lens L1) from the object side among the plurality of lenses may be a 'biconvex lens' in which the object side surface and the image side surface which are both convex. As the first lens (e.g., the first lens L1) from the object side is implemented as a biconvex lens, it is possible to focus the light incident on the first lens from the object side, and the light passing through the first lens (e.g., the first lens L1) from the object side is dispersed. Thus, there may be improvements in controlling aberration and sensitivity in the other lenses, as compared to the first lens from the object side.

Figure 13:
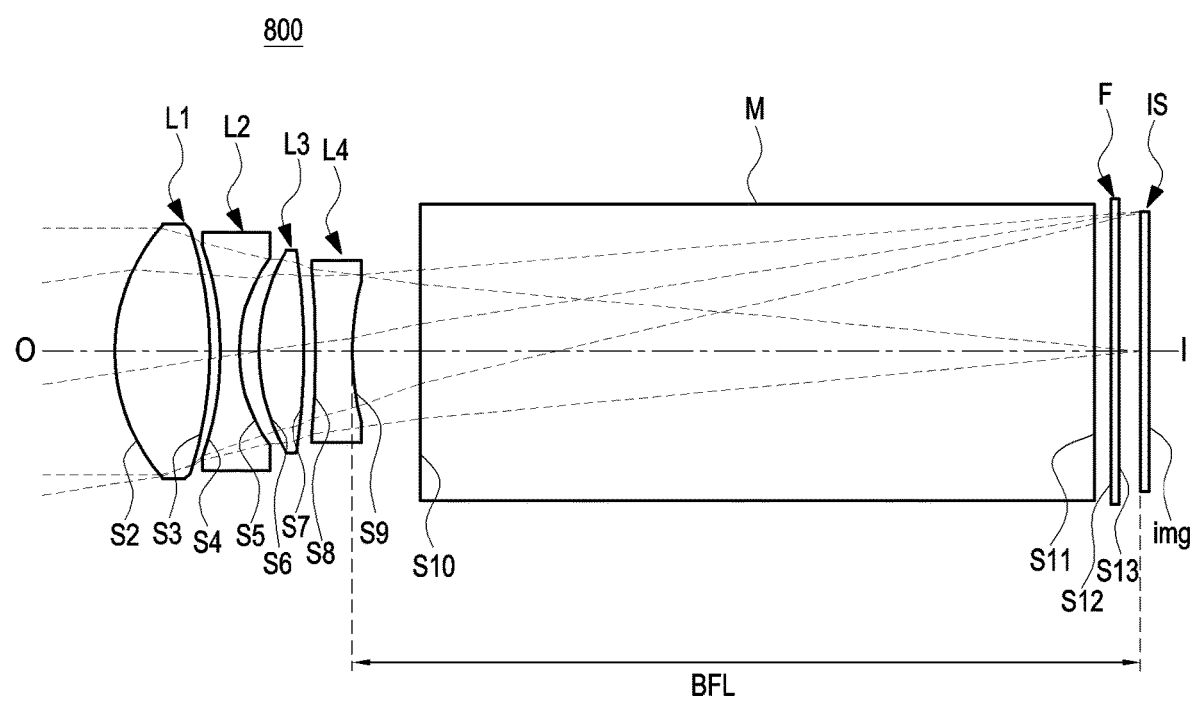
FIG. 13 is a view illustrating a configuration of a lens assembly according to an embodiment.

According to various embodiments, the first lens (e.g., the first lens L1) from the object side among the plurality of lenses may form at least one aspheric surface of the first lens (e.g., the first lens L1). According to various embodiments, any one of the object-side surface L1S2 and the image-side surface L1S3 of the first lens (e.g., the first lens L1) from the object side may be formed as an aspheric surface. For example, spherical aberration that may occur while light passes through the lens assembly may be controlled by implementing at least one surface of the first lens (e.g., the first lens L1) from the object side as an aspheric surface. According to various embodiments, at least one surface of other lenses other than the first lens (e.g., the first lens L1) from the object side may be formed as an aspheric surface. Accordingly, it is possible to prevent a coma from being generated in the marginal portion of the image sensor IS, to facilitate astigmatism control, and to reduce the occurrence of field curvature from the chief portion to the marginal portion of the imaging plane "img" of the image sensor. According to an embodiment, as will be described below, as shown in FIG. 13, the lens assembly 300 of the present disclosure may apply the first lens (e.g., the first lens L1) from the object side of a plurality of lenses as a lens having a glass material according to various embodiments.

According to an embodiment, the lens assembly 300 may include at least one stop "sto." The stop adjusts the size of the aperture formed in the stop, and the amount of light reaching the imaging plane "img" of the image sensor may be adjusted by adjusting the size of the aperture. According to an embodiment, the position of the stop may be disposed on the object-side surface of the first lens (e.g., the first lens L1) from the object side, but is not necessarily limited thereto.

According to various embodiments, the lens assembly 300 may further include a filter F between the last lens from the object side and the image sensor IS. The filter F may block off light, e.g., infrared (IR) light, detected by the image sensor or a film of the optical device. The filter F may include at least one of, e.g., a low pass filter or a cover glass. For example, the filter F may allow the color of an image detected and captured by the image sensor IS to be closer to the actual color which a human sees and feels for the object. The filter F may transmit visible light, but reflect IR light such that IR light reaches the imaging plane "img" of the image sensor IS.

The electronic device of the disclosure may further include an optical member that refracts or reflects the light passing through the lens assembly 300 and incident to the image sensor IS. In other words, the electronic device of the disclosure may include a folded optical system. According to an embodiment, the optical member that refracts or reflects light may be referred to as a reflective member "M." According to an embodiment, the reflective member M may be disposed between the lens assembly and the image sensor. According to an embodiment, the path of the chief ray passing through the reflective member M may be parallel to the chief ray incident on the lens assembly. The reflective member may include a mirror and/or a prism. Here, the mirror may be a mirror that reflects or refracts light. According to an embodiment, one kind of reflective member of a mirror and a prism may be provided as the reflective member M. However, without limitations thereto, according to an embodiment, the reflective member M may include at least one of the mirror and the prism. According to another embodiment, the reflective member M may have a configuration including a plurality of mirrors and/or prisms. Accordingly, the reflective member M may change the path along which the light travels at least twice. According to various embodiments, it is possible to increase the focal length in downsized electronic devices by including the reflective member M.

Referring to FIG. 3B, the electronic device of the disclosure may include a reflective member including at least two reflective surfaces, as the reflective member M. For example, the reflective member M may include a first reflective surface M1 and a second reflective surface M2. FIG. 3B illustrates that the reflective member M includes two reflective surfaces but, without limitations thereto, the reflective member M may further include additional reflective surfaces not shown. According to an embodiment, at least two reflective surfaces may be reflective surfaces provided in one reflective member M. For example, at least two reflective surfaces may correspond to two opposite surfaces in one reflective member M having a parallelogram cross section shown in FIG. 3B. However, it should be noted that the present disclosure is not necessarily limited thereto. At least two reflective surfaces may be separately disposed on two or more reflective members M, rather than one.

In the embodiment shown in FIG. 3C, it is illustrated that the reflective member M includes four reflective surfaces M1, M2, M3 and M4. For example, the reflective member M may include a first reflective surface M1, a second reflective surface M2, a third reflective surface M3, and a fourth reflective surface M4. According to an embodiment, the reflective member M may include a parallelogram structure in which the first reflective surface M1 and the second reflective surface M2 are parallel to each other, and the third reflective surface M3 and the fourth reflective surface M4 are parallel to each other. According to an embodiment, the reflective member M of FIGS. 3B and 3C may be formed of an integral reflective member M, e.g., a prism and/or mirror structure in the form of a single body(or unibody), in which the entire reflective member M is formed with seamless joints. However, the present disclosure is not necessarily limited thereto, and the reflective member M may be formed of a combination of a plurality of sub-reflective members. In an embodiment of FIGS. 3B and 3C, a plurality of sub-reflecting members may be continuously connected to each other to form one reflective member M. For example, in an embodiment of FIG. 3B, the reflective member M may include a first sub-reflecting member having a first reflective surface M1 and a second sub-reflecting member having a second reflective surface M2. For example, in an embodiment of FIG. 3C, the reflective member M may include a first sub-reflecting member having a first reflective surface M1, a second sub-reflecting member having a second reflective surface M2, and a third sub-reflecting member having a third reflective surface M3 and a fourth reflective surface M4.

In the embodiment of FIG. 3B, an angle between the first reflective surface M1 and the normal line perpendicular to the optical axis O-I may be formed to be approximately 45 degrees, and in the embodiment of FIG. 3C, an angle between the first reflective surface M1 and the normal line perpendicular to the optical axis O-I may be formed to be approximately 30 degrees. In the embodiment of FIG. 3B, light is designed to be refracted and/or reflected at least twice while passing through the reflective member M, but in the embodiment of FIG. 3C, light may be designed to be refracted and/or reflected at least four times while passing through the reflective member M. Accordingly, in the embodiment of FIG. 3C, a distance at which light moves may be longer than the embodiment of FIG. 3B. Accordingly, in the embodiment of FIG. 3C, the back focal length (BFL) may be longer than the embodiment of FIG. 3B.

Meanwhile, FIG. 3B and 3C illustrates that the direction of the light incident on the lens assembly 300 may be identical to the direction of the light emitted to the image sensor IS, but alternatively, the scope of the disclosure may also include the case in which the direction of the light incident on the lens assembly 300 is opposite to the direction of the light emitted to the image sensor IS. For example, the reflective member M may be formed in an isosceles trapezoid shape rather than a parallelogram, and the direction of light incident to the lens assembly 300 and the direction of light emitted to the image sensor IS may be opposite to each other.

According to various embodiments, when a high-performance, large-sized image sensor is included, the captured image quality of the electronic device may be enhanced. For example, the image height IMG HT of the image sensor of the disclosure may have a size of 4.0 mm or more. Here, the image height of the image sensor may indicate half of the diagonal length of the image sensor. However, as the image sensor increases in size, the lens assembly corresponding thereto may be difficult to include within a compact electronic device in which further miniaturization is desirable. For example, the thickness of the electronic device may increase due to the length or width of the image sensor. Accordingly, according to an embodiment, as the lens assembly includes at least one reflective member, a degree of freedom in design variation regarding an arrangement direction of the lenses or an arrangement direction of the image sensor may be facilitated. Thus, even when the image sensor is enlarged, it may still be accommodatable within a compact, portable electronic device.

According to various embodiments of the disclosure, the lens assembly may be included in a small electronic device as a bright telephoto lens by satisfying conditional equation 1 and conditional equation 2 as follows.

$$0.6<BFL/EFL<1.1 \quad \text{[conditional equation 1]}$$

$$15<FOV<35 \quad \text{[conditional equation 2]}$$

In conditional equation 1, BFL (back focal length) is the distance from the image-side surface of the lens (e.g., the fourth lens L4) closest to the imaging plane "img" to the image sensor IS, and EFL (effective focal length) is the total focal length of the lens assembly 300. In conditional equation 2, FOV is the field of view of the entire optical system including the lens assembly 300. In the disclosure, a lens assembly is provided, including four lenses (the first lens L1, the second lens L2, the third lens L3, and the fourth lens L4). The focal length may be increased by forming a relatively "long" BFL (e.g., of a sufficient length), and a plurality of reflective members may be included. BFL may indicate the length on the optical axis O-I. BFL may indicate the distance from the image-side surface of the lens (e.g., the fourth lens L4) closest to the imaging plane "img" to the image sensor IS with respect to the light passing through the center of the lens. For example, in the embodiment of FIG. 3B, BFL may include the sum of the distance I1 from the image-side surface S9 of the lens (e.g., the fourth lens L4) closest to the imaging plane "img" to the first reflective surface M1 of the reflective member M, the distance I2 from the first reflective surface M1 to the second reflective surface M2, and the distance I3 from the second reflective surface M2 to the imaging plane "img" of the image sensor IS. If BFL/EFL in conditional equation 1 may be below the lower limit, it may be difficult to secure a distance sufficient to place the reflective member M. For example, if the distance from the image-side surface of the lens closest to the imaging plane "img" to the image sensor is short (e.g., insufficiently long as compared to a set value), it may be difficult to place a reflective member to change the light traveling path at least twice. As a result, this may increase the difficulty of providing additional miniaturization the module. If BFL/EFL in conditional equation 1 is set above the upper limit, the sensitivity of spherical aberration may be increased, which may lead to deteriorating image quality. Conditional equation 2 above may represent the field-of-view range of the telephoto lens. The angle of view range may be expressed as a conversion focal length corresponding thereto, and the angle of view range of Conditional Equation 2 may correspond to a value of approximately 85 mm to 150 mm of the converted focal length based on 35 mm film.

Further, the lens assembly may satisfy conditional equation 3 and conditional equation 4.

$$0.8<OTTL/EFL<1.4 \quad \text{[conditional equation 3]}$$

$$2.5<EFL/EFL1<3.4 \quad \text{[conditional equation 4]}$$

Here, in conditional equation 3, the OTTL (optical total length from image plane) represents an optical overall length, and may be the distance from the apex of the object-side surface of the first lens (e.g., the first lens L1) from the object side to the image sensor IS, EFL may be the total focal length of the lens assembly, and EFL1 may be the focal length of the first lens (e.g., the first lens L1) from the object side. If OTTL/EFL in conditional equation 3 is below the lower limit, the sensitivity of the lens(es) included in the lens assembly may be increased, rendering manufacture more difficult and, if above the upper limit, the module may be difficult to downsize. If EFL/EFL1 in conditional equation 4 is below the lower limit, the overall size of the lens assembly 300 may be increased resulting in difficulties for miniaturization of the module and, if above the upper limit, the sensitivity of spherical aberration is increased, rendering manufacture the electronic device more difficult.

Further, the lens assembly may satisfy conditional equation 5 and conditional equation 6.

$$2.5<EFL/L1LL<4.2 \quad \text{[conditional equation 5]}$$

$$-4.5<L1S3/L1S2<-0.6 \quad \text{[conditional equation 6]}$$

Here, in conditional equation 5, EFL may indicate the total focal length of the lens assembly 300, L1LL is the distance from the apex of the object-side surface of the first lens (e.g., the first lens L1) from the object side to the apex of the image-side surface of the lens (e.g., the fourth lens L4 in the embodiment of FIGS. 3A and 3B, and the fifth lens L5 in the embodiment of FIGS. 5, 7, and 9) closest to the image side and, in conditional equation 6, L1S3 may indicate the curvature of the image-side surface S3 of the first lens (e.g., the first lens L1) from the object side, and L1S2 may indicate the curvature of the object-side surface S2 of the first lens (e.g., the first lens L1) from the object side. If EFL/L1LL in conditional equation 5 is below the lower limit, the overall size of the lens assembly may increase, rendering it difficult to downsize the electronic device and, if above the upper limit, the sensitivity of the curvature of field may increase, making it difficult to manufacture the electronic device. If L1S3/L1S2 in conditional equation 6 is below the lower limit, to control spherical aberration, the shape sensitivity of the other lenses than the first lens (e.g., the first lens L1) from the object side may increase so as to make manufacture more difficult and, if above the upper limit, the field curvature aberration may be increased, thereby deteriorating image quality.

Further, the lens assembly may satisfy conditional equation 7.

$2.1 < BFL/L1LL < 3.8$ [conditional equation 7]

In conditional equation 1, BFL (back focal length) is the distance from the image-side surface of the lens (e.g., the fourth lens L4) closest to the imaging plane "img" to the image sensor IS, L1LL is the distance from the apex of the object-side surface of the first lens (e.g., the first lens L1) from the object side to the apex of the image-side surface of the lens (e.g., the fourth lens L4 in the embodiment of FIGS. 3A and 3B, and the fifth lens L5 in the embodiment of FIGS. 5, 7, and 9) closest to the image side. If BFL/L1LL in conditional equation 7 is below the lower limit, the angle of view (FOV) increases, which may be disadvantageous to implementation of a telephoto lens, which may increase the shape sensitivity of the lens. In addition, if above the upper limit, the sensitivity of the curvature of field may be increased, the angle of view (FOV) may be reduced, which is advantageous for implementing telephoto, but may lead to increases in the overall size of the camera module, which may not be suitable for a compact electronic device.

Table 1 shows various lens data of the lens assembly of FIG. 3A, where 'obj' may indicate the object, radius may mean the radius of curvature of the lens, thickness the thickness of the lens or air gap, EFL the focal length of all the lenses, "nd" the refractive index of the medium (e.g., lens), and "vd" the Abbe's number of the lens. The radius of curvature may denote a value or degree of curvature at each point on a curve or curved surface. Here, 'S1' may be a position considered in design of the lens assembly, rather than the actual lens surface. For example, 'S1' may indicate a point on the lens barrel. The lens barrel may contact the lens (e.g., the first lens L1) closest to the object side of the lens assembly. According to an embodiment, the stop "sto" may be disposed between the second lens from the object side and the third lens from the object side of the lens assembly. According to an embodiment, the position of the stop "sto" may be defined as the same as the position of the subject-side surface S6 of the third lens of the lens assembly. 'S2 to S13' may refer to the object-side and image-side surfaces of the plurality of lenses and filter F. Thickness marked on the object-side surface (e.g., S2) of a certain lens (e.g., the first lens L1) may indicate the thickness of the lens, and the thickness value marked on the image-side surface of a certain lens may be described as an air gap from the lens to the lens positioned behind the lens along the optical axis direction. For example, the thickness value marked on the image-side surface S3 of the first lens L1 may indicate data representing the air gap to the object-side surface S4 of the second lens L2. 'S12' and 'S13' may mean the object-side (O) surface and image-side (I) surface of the filter (IR cut filter) F.

The lens assembly 300 included in Table 1 below may relate to a telephoto lens having a field of view (FOV) of 25.9 degrees. Further, when the total focal length (EFL) is 18.183 mm, the F number (Fno) is about 2.798, and the optical total length from imaging plane (OTTL) is 24.799 mm, the lens assembly 300 included in Table 1 may satisfy the above-described conditions (and/or at least one of the above-described conditions). Further, the lens assembly corresponding to Table 1 below may adopt a prism as the reflective member. In the table below, portions marked with the symbol '*', such as 'S2*, S3*, S4*, S5*, S7*, S8*, and S9*' may mean the surfaces of lenses to which an aspheric surface is applied.

TABLE 1

| surface | radius | Thickness (air gap) | EFL | nd | Vd |
|---|---|---|---|---|---|
| obj | infinity | infinity | | | |
| S1 | infinity | 0.00000 | | | |
| S2* | 5.08080 | 2.06396 | 5.891 | 1.56545 | 40.49 |
| S3* | −8.39161 | 0.37620 | | | |
| S4* | −6.06754 | 0.32000 | −3.848 | 1.57238 | 34.34 |
| S5* | 3.56259 | 1.02608 | | | |
| S6(sto) | 4.28981 | 1.39845 | 6.959 | 1.54410 | 56.09 |
| S7* | −29.61756 | 0.16342 | | | |
| S8* | 19.84267 | 1.16873 | −20.078 | 1.56923 | 38.67 |
| S9* | 7.12389 | 0.47223 | | | |
| S10 | infinity | 17.00000 | infinity | 1.62041 | 60.32 |
| S11 | infinity | 0.50000 | | | |
| S12 | infinity | 0.21000 | infinity | 1.51680 | 64.17 |
| S13 | infinity | 0.08011 | | | |
| Img | infinity | 0.02000 | | | |

Table 2 below shows the aspheric surface coefficients of the plurality of lenses, and the aspheric surface coefficients may be calculated through conditional equation 8 below.

$$z = \frac{c'y^2}{1+\sqrt{1-(K+1)(c')^2 y^2}} + A(y)^4 + B(y)^6 + C(y)^8 + D(y)^{10} + E(y)^{12} + F(y)^{14} + G(y)^{16} + H(y)^{18} + I(y)^{20} + J(y)^{22} + K(y)^{24} + L(y)^{26} + M(y)^{28} + N(y)^{30}$$ [conditional equation 8]

Here, 'z' may indicate the distance sag from the apex of the lens to the optical axis O-I, 'c' the reciprocal of the radius of curvature of the lens at the apex of the lens, 'y' the distance in the direction perpendicular to the optical axis, 'K' the Conic constant, and 'A', 'B', 'C', 'D', 'E', 'F', 'G', 'H', 'I', 'J', 'K', 'L', 'M', and 'N' the aspheric coefficients.

TABLE 2

| Surf | 2_ASP | 3_ASP | 4_ASP | 5_ASP | 7_ASP | 8_ASP | 9_ASP |
|---|---|---|---|---|---|---|---|
| Radius | 5.08080E+00 | −8.39161E+00 | −6.06754E+00 | 3.56259E+00 | −2.96176E+01 | 1.98427E+01 | 7.12389E+00 |
| K(Conic) | −5.59520E−01 | −1.00000E+00 | −6.99266E+00 | −4.09128E−01 | 5.86008E+01 | −1.00000E+00 | −1.85250E−01 |
| A(4th) | −6.30634E−04 | −5.81716E−03 | −1.03989E−02 | −1.88419E−03 | −1.05726E−02 | −1.29047E−02 | 2.50904E−04 |
| B(6th) | 3.90575E−04 | 6.66301E−03 | 6.60975E−03 | −7.48547E−03 | 9.30486E−03 | 3.32547E−03 | −5.09800E−03 |
| C(8th) | −3.64064E−04 | −5.75856E−03 | −1.77050E−03 | 1.59137E−02 | −1.49373E−03 | 1.33797E−02 | 1.48332E−02 |
| D(10th) | 2.40759E−04 | 4.17388E−03 | 2.64353E−04 | −1.73803E−02 | −3.40435E−03 | −2.53808E−02 | −2.29846E−02 |
| E(12th) | −1.08081E−04 | −2.14871E−03 | −2.33992E−05 | 1.23219E−02 | 3.66608E−03 | 2.43740E−02 | 2.23633E−02 |
| F(14th) | 3.43996E−05 | 7.83436E−04 | 1.22003E−06 | −6.08931E−03 | −2.04964E−03 | −1.53134E−02 | −1.46259E−02 |
| G(16th) | −7.85388E−06 | −2.06328E−04 | −3.46664E−08 | 2.15672E−03 | 7.54777E−04 | 6.74273E−03 | 6.63804E−03 |
| H(18th) | 1.29105E−06 | 3.96887E−05 | 4.14435E−10 | −5.53687E−04 | −1.94298E−04 | −2.13563E−03 | −2.11681E−03 |
| I(20th) | −1.52448E−07 | −5.57705E−06 | 0.00000E+00 | 1.03039E−04 | 3.55591E−05 | 4.89947E−04 | 4.72797E−04 |
| J(22th) | 1.27784E−08 | 5.65895E−07 | 0.00000E+00 | −1.37362E−05 | −4.60794E−06 | −8.07812E−05 | −7.24188E−05 |
| K(24th) | −7.40292E−10 | −4.03496E−08 | 0.00000E+00 | 1.27575E−06 | 4.13134E−07 | 9.33625E−06 | 7.24614E−06 |

TABLE 2-continued

| Surf | 2_ASP | 3_ASP | 4_ASP | 5_ASP | 7_ASP | 8_ASP | 9_ASP |
|---|---|---|---|---|---|---|---|
| L(26th) | 2.81266E−11 | 1.91708E−09 | 0.00000E+00 | −7.81821E−08 | −2.43605E−08 | −7.18208E−07 | −4.26568E−07 |
| M(28th) | −6.29491E−13 | −5.44759E−11 | 0.00000E+00 | 2.83236E−09 | 8.49229E−10 | 3.30330E−08 | 1.12028E−08 |
| N(30th) | 6.28094E−15 | 7.00204E−13 | 0.00000E+00 | −4.57461E−11 | −1.32504E−11 | −6.87288E−10 | 0.00000E+00 |

FIG. 4A is a graph illustrating the spherical aberration of the lens assembly according to an embodiment (e.g., the embodiment of FIG. 3A) of various embodiments of the disclosure. Spherical aberration may refer to the phenomenon in which light beams passing through different portions (e.g., the chief portion and the marginal portion) of the lens are focused onto different positions.

In FIG. 4A, the horizontal axis refers to the degree of longitudinal spherical aberration, and the vertical axis refers to the result of normalization of the distance from the center of the optical axis. FIG. 2 may illustrate variations in longitudinal spherical aberration depending on light wavelengths. The longitudinal spherical aberration may be shown for each of light beams whose wavelengths are about 656.3000 nanometers (nm), about 587.6000 nm, about 546.1000 nm, about 486.1000 nm, and about 435.8000 nm. Referring to FIG. 4A, in a visible light range, the longitudinal spherical aberration of the lens assembly, according to an embodiment, may be limited to a range from about +0.100 to −0.100, so that stable optical properties may be secured.

FIG. 4B is a graph illustrating the astigmatism of the lens assembly according to an embodiment (e.g., the embodiment of FIG. 3) of various embodiments of the disclosure. Astigmatism may refer to a deviation between the focuses of the light beams passing in the vertical and horizontal directions when the tangential plane or meridian plane of the lens has a different radius from the radius of the sagittal plane of the lens.

Here, the astigmatism of the lens assembly may be obtained at a wavelength of about 546.1000 nm, wherein the dashed line Y may denote the astigmatism in the tangential plane direction (e.g., tangential field curvature), and the solid line X may denote the astigmatism in the sagittal plane direction (e.g., sagittal field curvature). It can be identified from the graph that the astigmatism is limited to a range from about +0.100 to −0.100, so that stable optical properties may be secured according to various embodiments of the disclosure.

FIG. 4C is a graph illustrating the distortion of the lens assembly according to an embodiment (e.g., the embodiment of FIG. 3) of various embodiments of the disclosure. Distortion occurs because the optical magnification varies depending on the distance from the optical axis. As compared with an image forming on a theoretical imaging plane "img," an image forming on the actual imaging plane "img" may be shown to be larger or smaller by distortion.

The distortion of the lens assembly is the result obtained in a wavelength of about 546.1000 nm. The image captured by the lens assembly may cause distortion at a point (e.g., marginal portion) off the optical axis. However, the distortion is a degree that may commonly occur in an optical device using a lens, and the lens assembly according to one of various embodiments of the disclosure (e.g., the embodiment of FIG. 3A) has a distortion rate of less than about 1.00% and may provide good optical properties.

Figure 5:
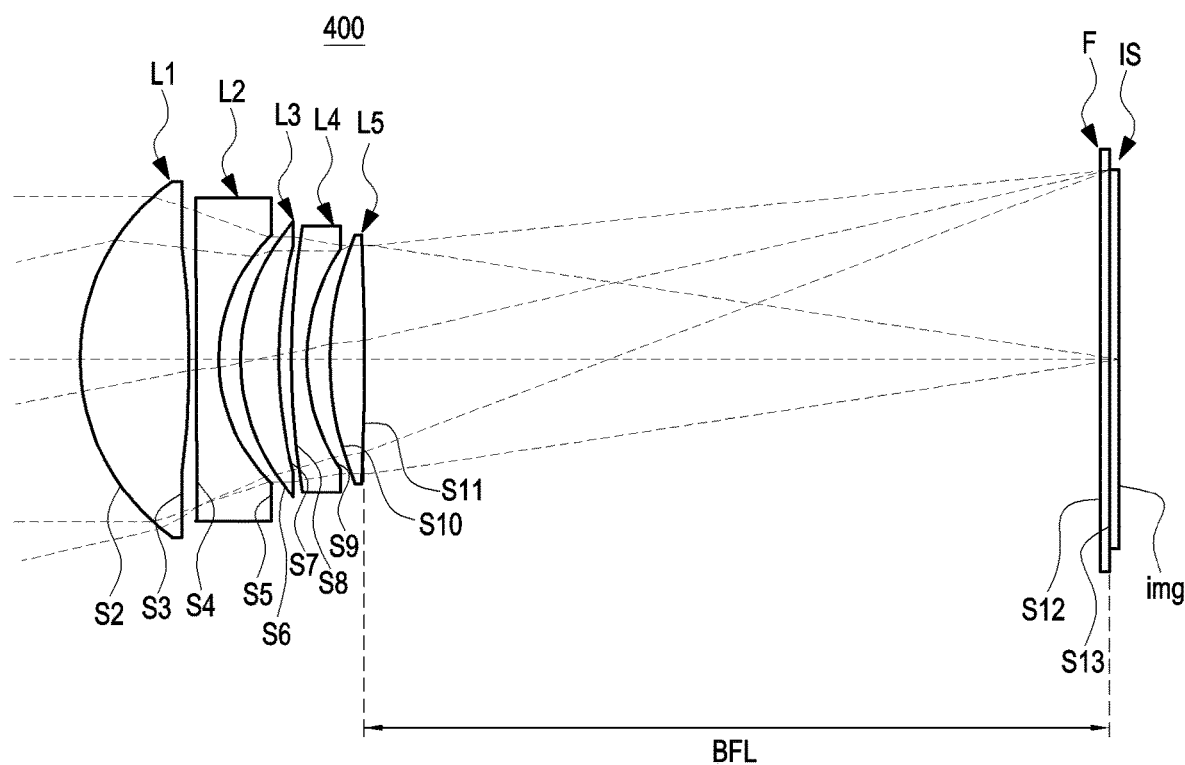
FIG. 5 is a view illustrating a configuration of a lens assembly according to an embodiment.
Figures 6A, 6B, 6C:
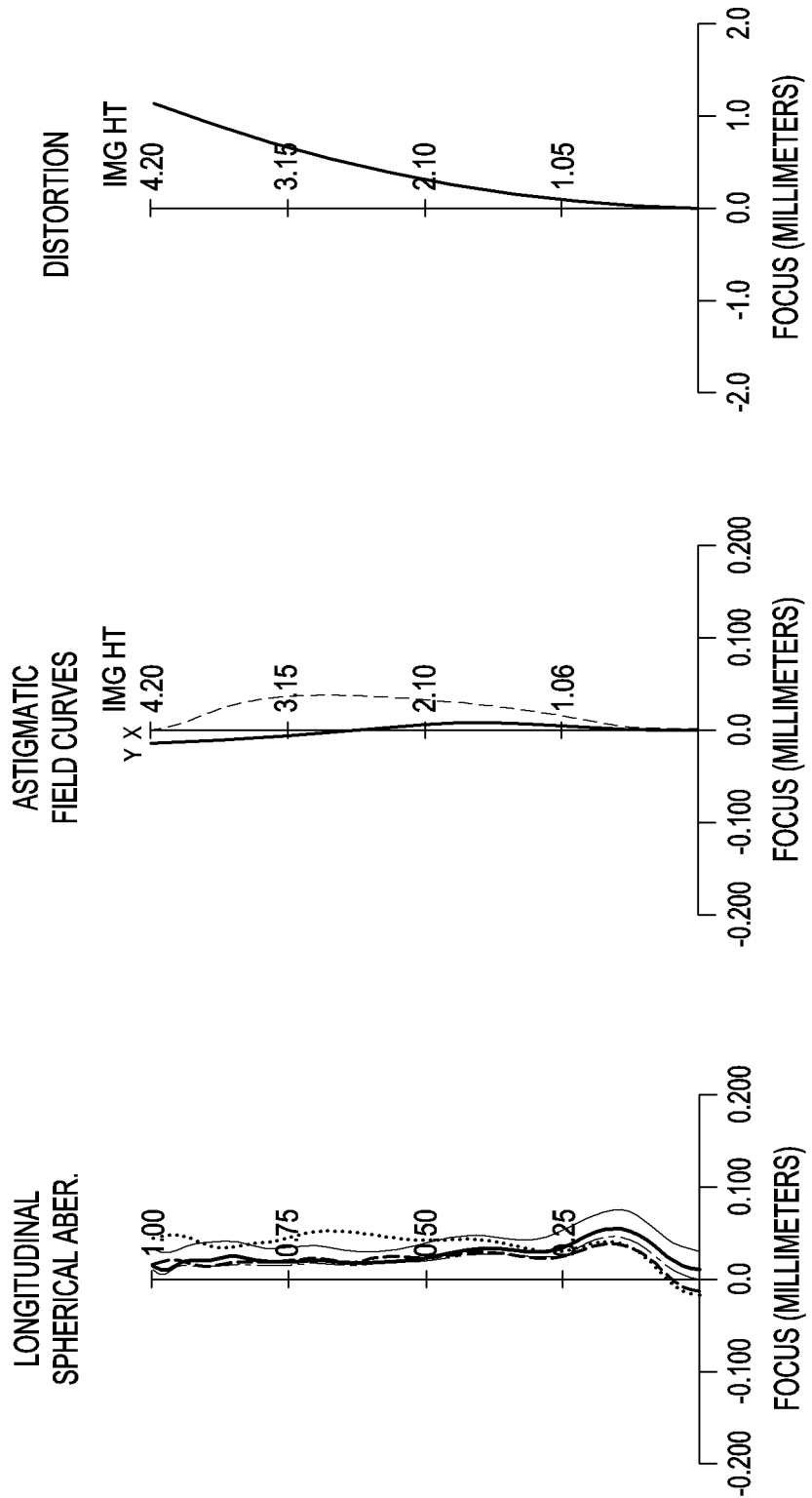
FIG. 6A is a graph illustrating the spherical aberration of the lens assembly of FIG. 5.
FIG. 6B is a graph illustrating astigmatism of the lens assembly of FIG. 5.
FIG. 6C is a graph illustrating the distortion of the lens assembly of FIG. 5.

FIG. 5 is a view illustrating a configuration of a lens assembly according to an embodiment. FIG. 6A is a graph illustrating the spherical aberration of the lens assembly of FIG. 5. FIG. 6B is a graph illustrating astigmatism of the lens assembly of FIG. 5. FIG. 6C is a graph illustrating the distortion of the lens assembly of FIG. 5.

The description of the lens assembly 300 according to the foregoing embodiments of FIG. 3A may apply to lens assemblies 400, 500, and 600 described below according to other various embodiments. Some of the plurality of lens assemblies 300, 400, 500, and 600 may have the same lens attribute (e.g., view angle, focal length, auto-focusing, f number, or optical zoom), or at least one lens assembly may have one or more lens attributes different from those of another lens assembly.

In describing the following embodiments of the disclosure, the same or similar, or no reference characters are given for components which may readily be appreciated from the above-described embodiments. No detailed description thereof is presented below as long as it overlaps the above description.

Referring to FIGS. 5 to 6C, the lens assembly 400 according to another one different from the embodiment of FIGS. 3A to 4C among various embodiments of the disclosure may include a plurality of lenses, an image sensor, and/or a filter. Here, the lens assembly according to the embodiment shown in FIGS. 5 and 6C may include 5 lenses. The lens assembly 400 may include a first lens L1, a second lens L2, a third lens L3, a fourth lens L4, and a fifth lens L5. The lens assembly 400 adopts a mirror as the reflective member, and in FIG. 5, the reflective member may not be illustrated. Table 3 below may represent various lens data about the lens assembly according to the embodiment of FIGS. 5 to 6C. In Table 3 below, portions marked with the symbol '*', such as 'S2*, S3*, S4*, S5*, S7*, S9*, S10*, S10*, and S11*' may mean the surfaces of lenses to which an aspheric surface is applied. Table 4 below may show data for defining aspheric coefficients of the plurality of lenses, respectively.

The lens assembly included in Table 3 below may relate to a telephoto lens having a field of view (FOV) of 19.7 degrees. Further, when the total focal length (EFL) is 23.927 mm, the F number (Fno) is about 3.305, and the optical total length from imaging plane (OTTL) is 22.554 mm, the lens assembly included in Table 3 may satisfy the above-described conditions (and/or at least one of the above-described conditions).

TABLE 3

| surface | Radius | Thickness (air gap) | EFL | nd | Vd |
|---|---|---|---|---|---|
| obj | infinity | infinity | | | |
| S1 | infinity | 0.00000 | | | |
| S2* | 5.10544 | 2.31092 | 7.423 | 1.55335 | 47.92 |
| S3* | −18.07702 | 0.17421 | | | |
| S4* | −120.55939 | 0.48470 | −6.237 | 1.59314 | 28.83 |
| S5* | 3.85439 | 0.49474 | | | |
| 6(sto) | 4.87568 | 0.85819 | 13.356 | 1.54410 | 56.09 |
| S7* | 13.77636 | 0.25270 | | | |
| S8 | 24.70420 | 0.32000 | −6.950 | 1.60576 | 26.4 |

TABLE 3-continued

| surface | Radius | Thickness (air gap) | EFL | nd | Vd |
|---|---|---|---|---|---|
| S9* | 3.60654 | 0.49372 | | | |
| S10* | 7.19625 | 0.74478 | 9.720 | 1.67635 | 18.7 |
| S11* | −85.09651 | 16.00000 | | | |
| 12 | infinity | 0.32000 | infinity | 1.51680 | 64.17 |
| 13 | infinity | 0.07998 | | | |
| img | infinity | 0.02000 | | | |

TABLE 4

| Surf | 2_ASP | 3_ASP | 4_ASP | 5_ASP |
|---|---|---|---|---|
| Radius | 5.10544E+00 | −1.80770E+01 | −1.20559E+02 | 3.85439E+00 |
| K(Conic) | −4.54228E−01 | −1.00000E+00 | −1.00000E+00 | 3.11199E−01 |
| A(4th) | 2.32958E−04 | 1.50195E−03 | −3.84313E−05 | 3.12422E−04 |
| B(6th) | 6.44490E−04 | −5.56604E−06 | 2.47359E−04 | 5.50241E−03 |
| C(8th) | −7.34362E−04 | 2.24445E−04 | −1.63146E−04 | −1.07794E−02 |
| D(10th) | 4.89213E−04 | −2.28664E−04 | 4.46146E−05 | 1.13192E−02 |
| E(12th) | −2.14310E−04 | 1.02111E−04 | −6.95711E−06 | −7.91956E−03 |
| F(14th) | 6.50505E−05 | −2.55550E−05 | 6.56344E−07 | 3.92964E−03 |
| G(16th) | −1.40505E−05 | 3.60350E−06 | −3.42957E−08 | −1.42392E−03 |
| H(18th) | 2.18802E−06 | −1.90923E−07 | 7.56337E−10 | 3.80557E−04 |
| I(20th) | −2.46118E−07 | −2.62616E−08 | 0.00000E+00 | −7.47850E−05 |
| J(22th) | 1.97983E−08 | 6.41037E−09 | 0.00000E+00 | 1.06491E−05 |
| K(24th) | −1.10998E−09 | −6.28007E−10 | 0.00000E+00 | −1.06688E−06 |
| L(26th) | 4.11805E−11 | 3.44438E−11 | 0.00000E+00 | 7.12106E−08 |
| M(28th) | −9.08476E−13 | −1.03623E−12 | 0.00000E+00 | −2.84016E−09 |
| N(30th) | 9.02250E−15 | 1.33925E−14 | 0.00000E+00 | 5.11804E−11 |

| Surf | 7_ASP | 9_ASP | 10_ASP | 11_ASP |
|---|---|---|---|---|
| Radius | 1.37764E+01 | 3.60654E+00 | 7.19625E+00 | −8.50965E+01 |
| K(Conic) | 1.93997E+01 | −3.99839E−01 | 4.72561E+00 | −1.00000E+00 |
| A(4th) | 2.39519E−03 | −1.37978E−02 | −1.05908E−02 | −3.20463E−03 |
| B(6th) | −1.73913E−02 | 3.21584E−02 | 2.54732E−02 | 9.77814E−03 |
| C(8th) | 3.18466E−02 | −6.08928E−02 | −4.37900E−02 | −1.41125E−02 |
| D(10th) | −3.26934E−02 | 6.82880E−02 | 4.67957E−02 | 1.22768E−02 |
| E(12th) | 2.21069E−02 | −5.11529E−02 | −3.42344E−02 | −6.99013E−03 |
| F(14th) | −1.05009E−02 | 2.70679E−02 | 1.79473E−02 | 2.71117E−03 |
| G(16th) | 3.61976E−03 | −1.04165E−02 | −6.90813E−03 | −7.29768E−04 |
| H(18th) | −9.19015E−04 | 2.95376E−03 | 1.97120E−03 | 1.36486E−04 |
| I(20th) | 1.72080E−04 | −6.17419E−04 | −4.15959E−04 | −1.74187E−05 |
| J(22th) | −2.34850E−05 | 9.39652E−05 | 6.39783E−05 | 1.44817E−06 |
| K(24th) | 2.27128E−06 | −1.01198E−05 | −6.96141E−06 | −7.07607E−08 |
| L(26th) | −1.47414E−07 | 7.30347E−07 | 5.07006E−07 | 1.54306E−09 |
| M(28th) | 5.75535E−09 | −3.16629E−08 | −2.21473E−08 | 0.00000E+00 |
| N(30th) | −1.02100E−10 | 6.22992E−10 | 4.38336E−10 | 0.00000E+00 |

Figure 7:
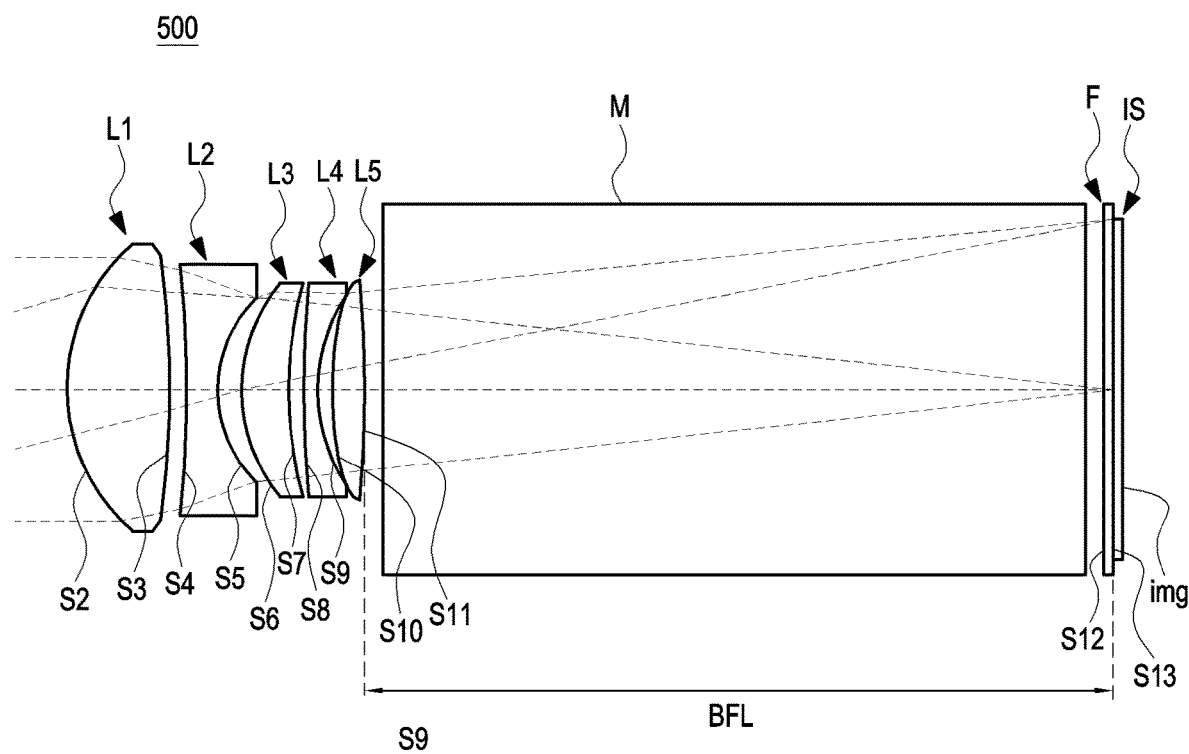
FIG. 7 is a view illustrating a configuration of a lens assembly according to an embodiment.

FIG. 7 is a view illustrating a configuration of a lens assembly according to an embodiment. FIG. 8A is a graph illustrating the spherical aberration of the lens assembly of FIG. 7. FIG. 8B is a graph illustrating astigmatism of the lens assembly of FIG. 7. FIG. 8C is a graph illustrating the distortion of the lens assembly of FIG. 7.

Referring to FIGS. 7 to 8C, the lens assembly 500 according to another one different from the embodiment of FIGS. 3A to 4C among various embodiments of the disclosure may include a plurality of lenses, an image sensor, and/or a filter. Here, the lens assembly according to the embodiment shown in FIGS. 7 to 8C may include 5 lenses. The lens assembly 500 may include a first lens L1, a second lens L2, a third lens L3, a fourth lens L4, and a fifth lens L5. The lens assembly 500 may include a reflective member M capable of changing the path of the light passing through the fifth lens L5 at least twice or more. The lens assembly 500 may adopt a prism as the reflective member M.

In Table 5 below, portions marked with the symbol '*', such as 'S2*, S3*, S5*, S7*, S9*, and S10*', may mean the surfaces of lenses to which an aspheric surface is applied.

Various lens data about the lens assembly 500 may be shown. Table 6 below may show data for defining aspheric coefficients of the plurality of lenses, respectively.

The lens assembly 500 included in Table 5 below may relate to a telephoto lens having a field of view (FOV) of 23.7 degrees. Further, when the total focal length (EFL) is 19.784 mm, the F number (Fno) is about 3.016, and the optical total length from imaging plane (OTTL) is 25.076 mm, the lens assembly included in Table 6 may satisfy the above-described conditions (and/or at least one of the above-described conditions).

TABLE 5

| surface | radius | Thickness (air gap) | EFL | nd | Vd |
|---|---|---|---|---|---|
| obj | infinity | infinity | | | |
| S1 | infinity | 0.00000 | | | |
| S2* | 5.18714 | 2.34208 | 6.844 | 1.54420 | 55.98 |
| S3* | −11.27258 | 0.30759 | | | |
| S4 | −24.63502 | 0.80000 | −5.336 | 1.57374 | 33.9 |
| S5* | 3.56574 | 0.50727 | | | |
| S6(sto) | 4.31100 | 1.14262 | 10.010 | 1.59978 | 28.81 |
| S7* | 13.48172 | 0.27761 | | | |
| S8 | 30.17119 | 0.28000 | −7.018 | 1.57194 | 34.48 |
| S9* | 3.55189 | 0.35767 | | | |
| S10* | 7.08914 | 0.75078 | 11.026 | 1.54410 | 56.09 |
| S11 | −38.63477 | 0.50000 | | | |
| S12 | infinity | 17.00000 | infinity | 1.62624 | 59.18 |
| S13 | infinity | 0.50000 | | | |
| S14 | infinity | 0.21000 | infinity | 1.51680 | 64.17 |
| S15 | infinity | 0.07994 | | | |
| img | infinity | 0.02 | | | |

TABLE 6

| Surf | 2_ASP | 3_ASP | 5_ASP | 7_ASP | 9_ASP | 10_ASP |
|---|---|---|---|---|---|---|
| Radius | 5.18714E+00 | −1.12726E+01 | 3.56574E+00 | 1.34817E+01 | 3.55189E+00 | 7.08914E+00 |
| K(Conic) | −4.71862E−06 | −1.00000E+00 | 3.00248E−01 | 1.94969E+01 | −1.99309E−01 | 5.12193E+00 |
| A(4th) | 1.72439E−04 | 1.41785E−03 | −1.30900E−04 | 1.52857E−04 | −8.03848E−03 | −5.15725E−03 |
| B(6th) | 7.47143E−04 | 9.73288E−04 | 1.33140E−03 | −6.15102E−03 | 1.35092E−02 | 6.25004E−03 |
| C(8th) | −8.35314E−04 | −1.09452E−03 | −5.43847E−03 | 1.34828E−02 | −2.90250E−02 | −9.72911E−03 |
| D(10th) | 5.72780E−04 | 7.09483E−04 | 9.35412E−03 | −1.67162E−02 | 3.80670E−02 | 1.04792E−02 |
| E(12th) | −2.57299E−04 | −3.11517E−04 | −9.69876E−03 | 1.39619E−02 | −3.44310E−02 | −9.02240E−03 |
| F(14th) | 7.91837E−05 | 9.63081E−05 | 6.61806E−03 | −8.30814E−03 | 2.24789E−02 | 6.29927E−03 |
| G(16th) | −1.71178E−05 | −2.12926E−05 | −3.11000E−03 | 3.61465E−03 | −1.08081E−02 | −3.41568E−03 |
| H(18th) | 2.62815E−06 | 3.37754E−06 | 1.02945E−03 | −1.16149E−03 | 3.84949E−03 | 1.37689E−03 |
| I(20th) | −2.85970E−07 | −3.80993E−07 | −2.41728E−04 | 2.75033E−04 | −1.01023E−03 | −4.00988E−04 |
| J(22th) | 2.16807E−08 | 2.97888E−08 | 3.99793E−05 | −4.73121E−05 | 1.92198E−04 | 8.25020E−05 |
| K(24th) | −1.10267E−09 | −1.52930E−09 | −4.54572E−06 | 5.74008E−06 | −2.57115E−05 | −1.16481E−05 |
| L(26th) | 3.49206E−11 | 4.58543E−11 | 3.37590E−07 | −4.64853E−07 | 2.28873E−06 | 1.07197E−06 |
| M(28th) | −5.88800E−13 | −5.72994E−13 | −1.47146E−08 | 2.25223E−08 | −1.21553E−07 | −5.78889E−08 |
| N(30th) | 3.43987E−15 | −1.72223E−15 | 2.84833E−10 | −4.93247E−10 | 2.91193E−09 | 1.39168E−09 |

Figure 9:
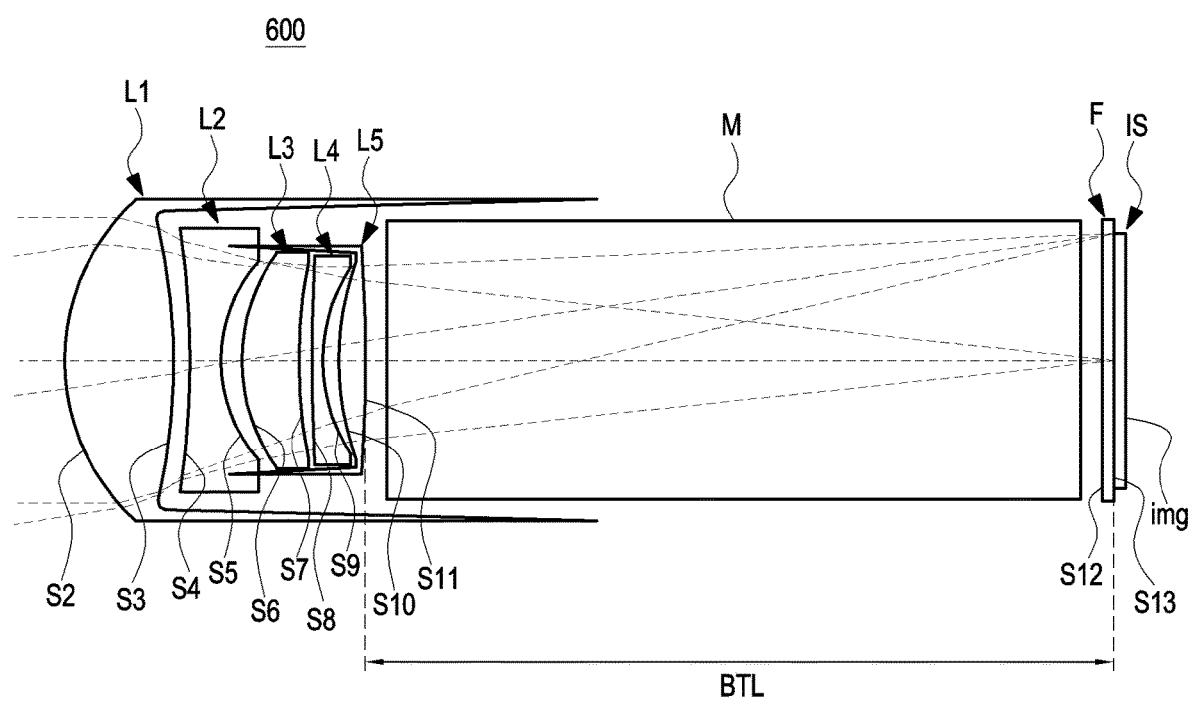
FIG. 9 is a view illustrating a configuration of a lens assembly according to an embodiment.
Figure 10C:
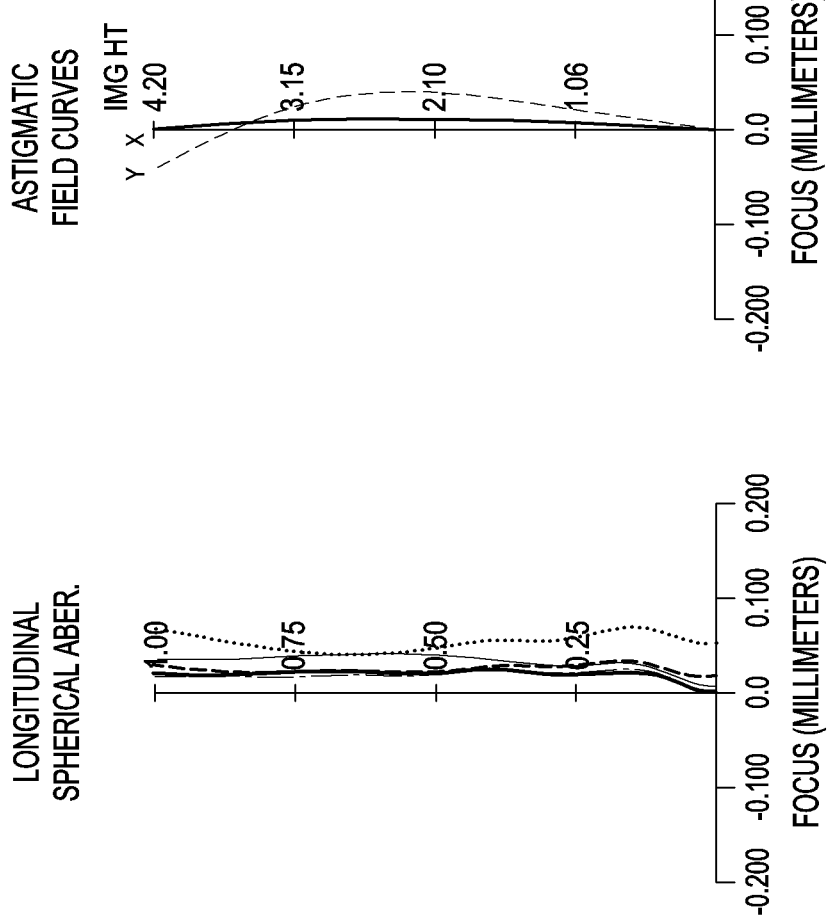
FIG. 10C is a graph illustrating the distortion of the lens assembly of FIG. 9.
Figure 10B:
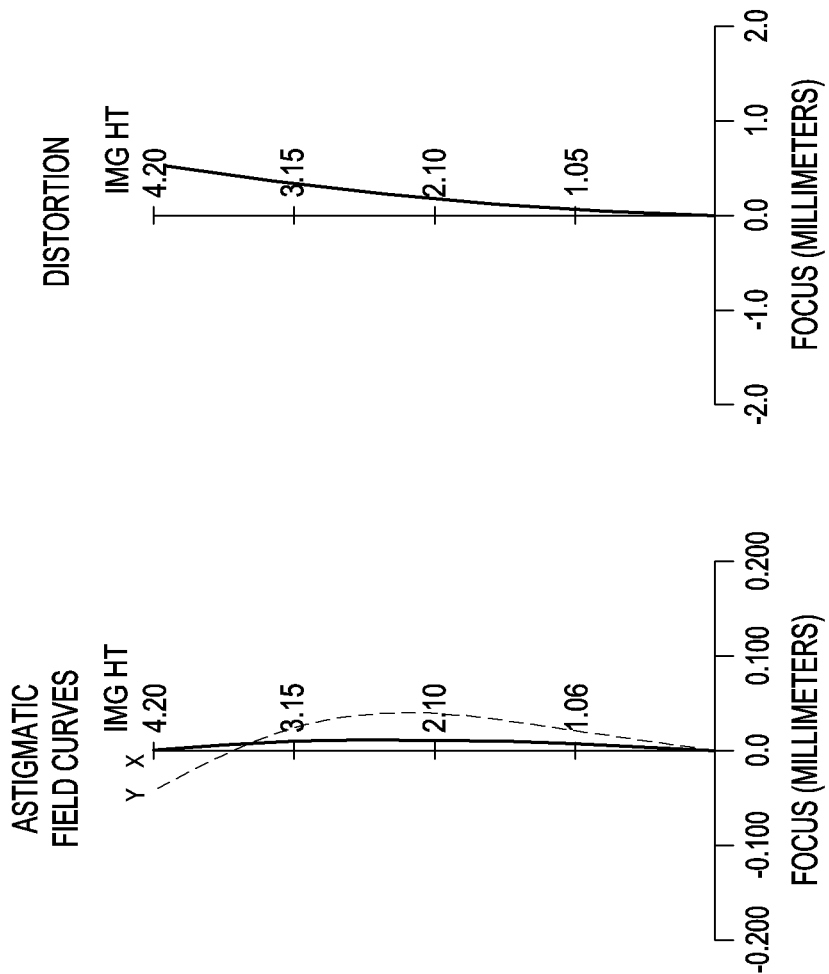
FIG. 10B is a graph illustrating astigmatism of the lens assembly of FIG. 9.
Figure 10A:
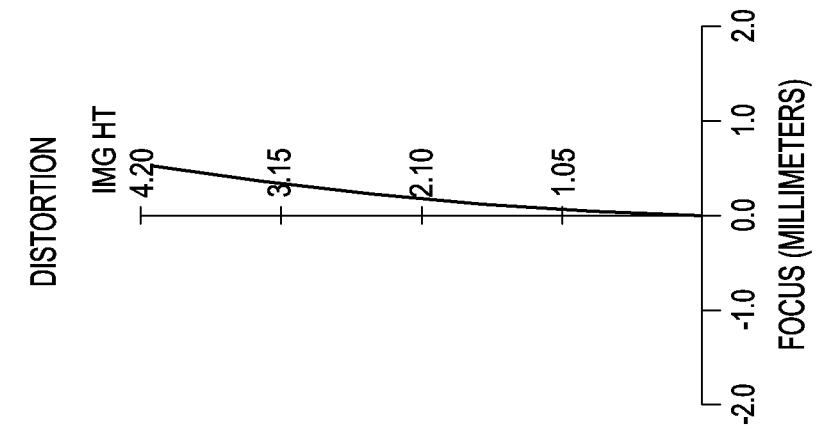
FIG. 10A is a graph illustrating the spherical aberration of the lens assembly of FIG. 9.

FIG. 9 is a view illustrating a configuration of a lens assembly according to an embodiment. FIG. 10A is a graph illustrating the spherical aberration of the lens assembly of FIG. 9. FIG. 10B is a graph illustrating astigmatism of the lens assembly of FIG. 9. FIG. 10C is a graph illustrating the distortion of the lens assembly of FIG. 9.

Referring to FIGS. 9 to 10C, the lens assembly 600 according to another one different from the embodiment of FIGS. 3A to 4C among various embodiments of the disclosure may include a plurality of lenses, an image sensor IS, and/or a filter F. Here, the lens assembly according to the embodiment shown in FIGS. 9 to 10C may include 5 lenses. The lens assembly 600 may include a first lens L1, a second lens L2, a third lens L3, a fourth lens L4, and a fifth lens L5. The lens assembly 600 may include a reflective member M capable of changing the path of the light passing through the fifth lens L5 at least twice or more. The lens assembly 600 may adopt a prism as the reflective member M.

Table 7 below may represent various lens data about the lens assembly 600 according to the embodiment of FIGS. 9 to 10C. In Table 7 below, portions marked with the symbol '*', such as 'S2*, S3*, S5*, S7*, S9*, and S10*', may mean the surfaces of lenses to which an aspheric surface is applied. Table 8 below may show data for defining aspheric coefficients of the plurality of lenses, respectively.

The lens assembly 600 included in Table 7 below may relate to a telephoto lens having a field of view (FOV) of 17.1 degrees. Further, when the total focal length (EFL) is 27.812 mm, the F number (Fno) is about 2.959, and the optical total length from imaging plane (OTTL) is 35.416 mm, the lens assembly 600 included in Table 8 may satisfy the above-described conditions (and/or at least one of the above-described conditions).

TABLE 7

| surface | radius | Thickness (air gap) | EFL | nd | Vd |
|---|---|---|---|---|---|
| obj | infinity | infinity | | | |
| S1 | infinity | 0.00000 | | | |
| S2* | 7.32900 | 3.36024 | 9.650 | 1.54410 | 56.09 |
| S3* | −15.74720 | 0.44786 | | | |
| S4 | −35.64224 | 1.12941 | −7.401 | 1.58144 | 31.64 |
| S5* | 4.99328 | 0.63974 | | | |
| S6(sto) | 6.06130 | 1.89406 | 12.553 | 1.66298 | 19.8 |
| S7* | 18.91767 | 0.41458 | | | |
| S8 | 43.25604 | 0.38000 | −8.994 | 1.62661 | 23.32 |
| S9* | 5.01345 | 0.48748 | | | |
| S10* | 9.95612 | 0.85411 | 15.518 | 1.54410 | 56.09 |
| S11 | −55.43807 | 0.70588 | | | |
| S12 | infinity | 24.00000 | infinity | 1.69774 | 49.03 |
| S13 | infinity | 0.70588 | | | |
| S14 | infinity | 0.29647 | infinity | 1.51680 | 64.17 |
| S15 | infinity | 0.07996 | | | |
| Img | infinity | 0.02 | | | |

TABLE 8

| Surf | 2_ASP | 3_ASP | 5_ASP | 7_ASP | 9_ASP | 10_ASP |
|---|---|---|---|---|---|---|
| Radius | 7.32900E+00 | −1.57472E+01 | 4.99328E+00 | 1.89177E+01 | 5.01345E+00 | 9.95612E+00 |
| K(Conic) | −4.68379E−01 | −1.00000E+00 | 3.00348E−01 | 1.95415E+01 | −1.96637E−01 | 5.12095E+00 |
| A(4th) | 9.97543E−05 | 4.83871E−04 | 3.58210E−04 | −8.19193E−04 | −1.78124E−03 | −1.48239E−03 |
| B(6th) | 1.05669E−04 | 2.02408E−04 | −4.94104E−04 | 8.15498E−04 | −4.32899E−04 | 1.75542E−04 |
| C(8th) | −6.31717E−05 | −1.24245E−04 | 2.76680E−04 | −7.80458E−04 | 7.33338E−04 | 1.38965E−04 |
| D(10th) | 2.25038E−05 | 4.57899E−05 | −1.08659E−04 | 5.40379E−04 | −6.39768E−04 | −1.94103E−04 |
| E(12th) | −5.19212E−06 | −1.17381E−05 | 3.15974E−05 | −2.60722E−04 | 3.41915E−04 | 9.94148E−05 |
| F(14th) | 8.19162E−07 | 2.16851E−06 | −7.72083E−06 | 8.93436E−05 | −1.22672E−04 | −2.82415E−05 |
| G(16th) | −9.10868E−08 | −2.93050E−07 | 1.69444E−06 | −2.21049E−05 | 3.09432E−05 | 4.62680E−06 |
| H(18th) | 7.24718E−09 | 2.91155E−08 | −3.19464E−07 | 3.98719E−06 | −5.64333E−06 | −3.81457E−07 |
| I(20th) | −4.13619E−10 | −2.11906E−09 | 4.71604E−08 | −5.24928E−07 | 7.56654E−07 | 2.39035E−09 |
| J(22th) | 1.67573E−11 | 1.11421E−10 | −5.04370E−09 | 4.99238E−08 | −7.47868E−08 | 1.99919E−09 |
| K(24th) | −4.69015E−13 | −4.11281E−12 | 3.71766E−10 | −3.34001E−09 | 5.34748E−09 | −7.08698E−11 |
| L(26th) | 8.59101E−15 | 1.00970E−13 | −1.77494E−11 | 1.49034E−10 | −2.62382E−10 | −1.04158E−11 |
| M(28th) | −9.22302E−17 | −1.47893E−15 | 4.92589E−13 | −3.97808E−12 | 7.87736E−12 | 9.33711E−13 |
| N(30th) | 4.37173E−19 | 9.77186E−18 | −6.02386E−15 | 4.79923E−14 | −1.08365E−13 | −2.25172E−14 |

Figure 11:
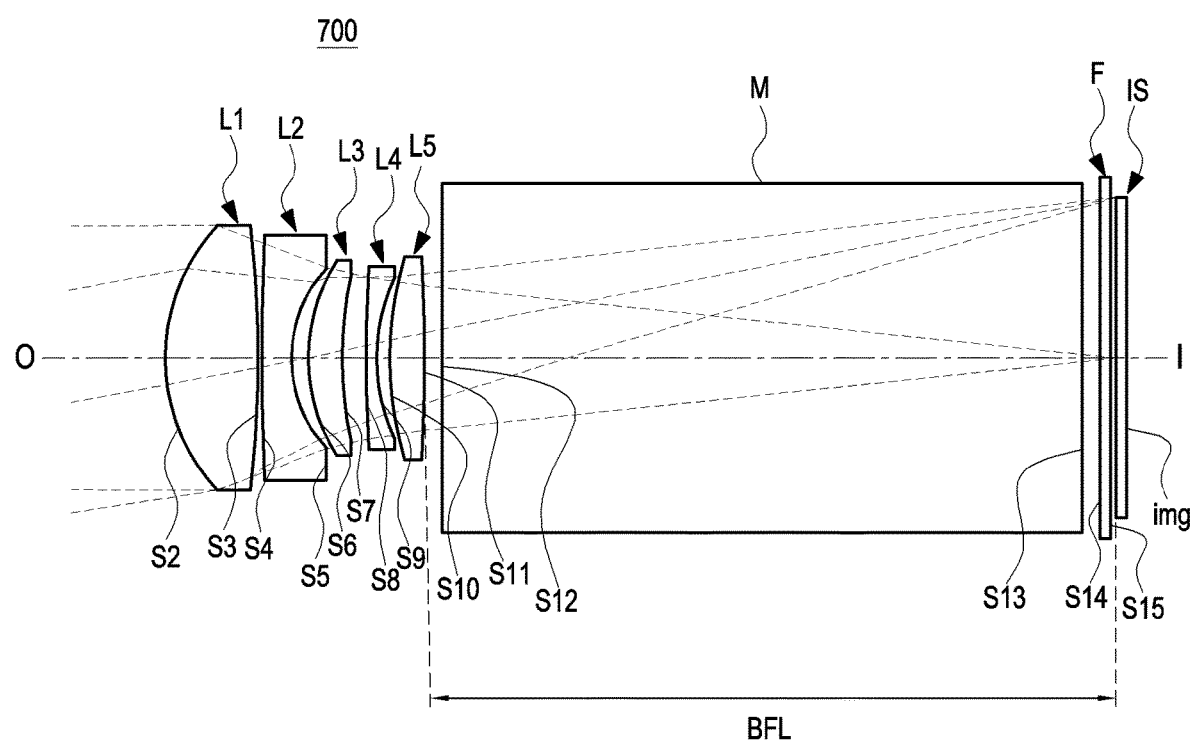
FIG. 11 is a view illustrating a configuration of a lens assembly according to an embodiment.
Figure 12A:
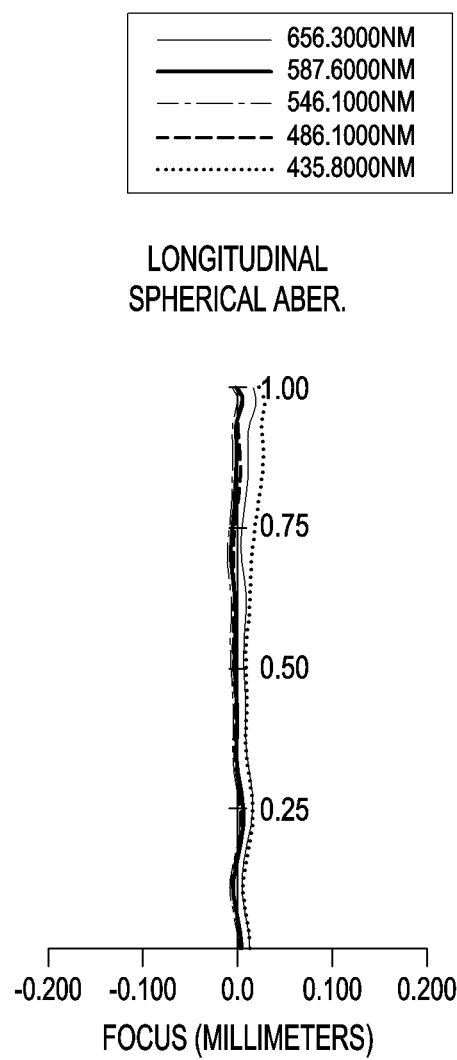
FIG. 12A is a graph illustrating the spherical aberration of the lens assembly of FIG. 11.
Figure 12B:
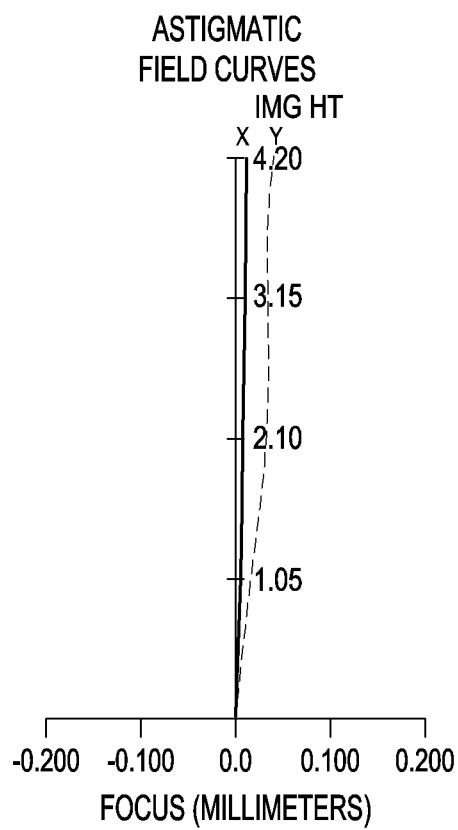
FIG. 12B is a graph illustrating astigmatism of the lens assembly of FIG. 11.
Figure 12C:
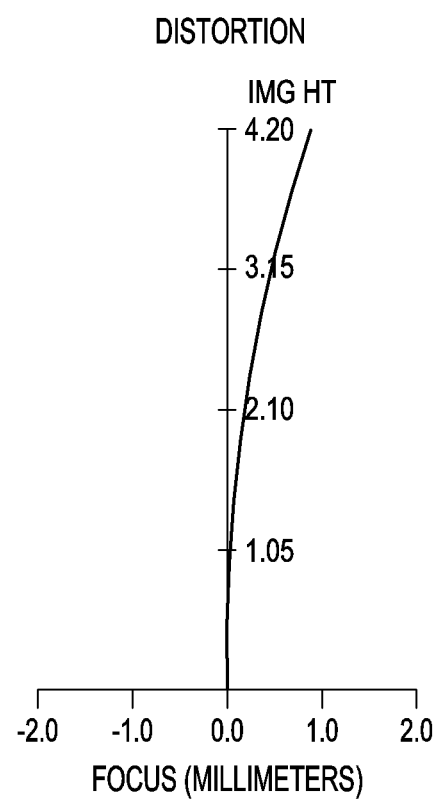
FIG. 12C is a graph illustrating the distortion of the lens assembly of FIG. 11.

FIG. 11 is a view illustrating a configuration of a lens assembly according to an embodiment. FIG. 12A is a graph illustrating the spherical aberration of the lens assembly of FIG. 11. FIG. 12B is a graph illustrating astigmatism of the lens assembly of FIG. 11. FIG. 12C is a graph illustrating the distortion of the lens assembly of FIG. 11.

Referring to FIGS. 11 to 12C, the lens assembly 700 according to another one different from the embodiment of FIGS. 3A to 4C among various embodiments of the disclosure may include a plurality of lenses, an image sensor IS, and/or a filter F. Here, the lens assembly according to the embodiment shown in FIGS. 11 to 12C may include 5 lenses. The lens assembly 700 may include a first lens L1, a second lens L2, a third lens L3, a fourth lens L4, and a fifth lens L5. In the lens assembly 700, the second lens L2 may be different from the above-described embodiments in that the surface facing the object side has a convex shape. The lens assembly 700 may include a reflective member M that is capable of changing the path of the light passing through the fifth lens L5 at least twice or more. The lens assembly 700 may adopt a prism as the reflective member M.

Table 9 below may represent various lens data about the lens assembly 700 according to the embodiment of FIGS. 11 to 12C. In Table 9 below, portions marked with the symbol '*', such as 'S 2*, S3*, S5*, S7*, S9*, and S10*', which may indicate surfaces of lenses to which an aspheric surface is applied. Table 10 below may show data for defining aspheric coefficients of the plurality of lenses, respectively.

The lens assembly 700 included in Table 9 below may relate to a telephoto lens having a field of view (FOV) of 22.4 degrees. Further, when the total focal length (EFL) is 21.000 mm, the F number (Fno) is about 3.135, and the optical total length from imaging plane (OTTL) is 25.193 mm, the lens assembly 700 included in Table 9 may satisfy the above-described conditions (and/or at least one of the above-described conditions).

TABLE 9

| surface | radius | Thickness (air gap) | EFL | nd | Vd |
|---|---|---|---|---|---|
| obj | infinity | infinity | | | |
| S1 | infinity | 0.00000 | | | |
| S2* | 4.88592 | 2.46301 | 6.927 | 1.54167 | 55.64 |
| S3* | −13.54449 | 0.10000 | | | |
| S4 | 99.51486 | 0.78085 | −5.596 | 1.59056 | 29.75 |
| S5* | 3.21370 | 0.46865 | | | |
| S6(sto) | 4.72372 | 0.87922 | 10.687 | 1.67096 | 19.06 |
| S7* | 12.50663 | 0.65026 | | | |
| S8 | 33.31015 | 0.28895 | −7.658 | 1.61672 | 25.24 |
| S9* | 4.15629 | 0.34928 | | | |
| S10* | 9.14186 | 0.90291 | 13.546 | 1.54772 | 52.54 |
| S11 | −38.93002 | 0.50000 | | | |
| S12 | infinity | 17.00000 | infinity | 1.57170 | 49.07 |
| S13 | infinity | 0.50000 | | | |
| S14 | infinity | 0.21000 | infinity | 1.51680 | 64.17 |
| S15 | infinity | 0.09991 | | | |
| Img | infinity | 0 | | | |

TABLE 10

| Surf | 2_ASP | 3_ASP | 5_ASP | 7_ASP | 9_ASP | 10_ASP |
|---|---|---|---|---|---|---|
| Radius | 4.88592E+00 | −1.35445E+01 | 3.21370E+00 | 1.25066E+01 | 4.15629E+00 | 9.14187E+00 |
| K(Conic) | −4.91767E−01 | −1.00000E+00 | 2.37944E−01 | 1.94100E+01 | −2.52789E−01 | 7.10173E+00 |
| A(4th) | 1.60820E−04 | 1.02078E−03 | −1.97859E−03 | 5.25147E−04 | −2.75289E−03 | −6.85872E−04 |
| B(6th) | 3.70376E−04 | 1.36851E−03 | 9.68698E−03 | −8.48789E−03 | −7.29294E−03 | −3.22085E−03 |
| C(8th) | −3.54812E−04 | −1.75556E−03 | −2.62716E−02 | 2.59588E−02 | 9.48503E−03 | 7.78218E−04 |
| D(10th) | 2.07591E−04 | 1.27368E−03 | 4.08071E−02 | −4.47939E−02 | −8.77195E−03 | 4.61624E−03 |
| E(12th) | −8.24404E−05 | −5.80919E−04 | −4.13716E−02 | 5.06176E−02 | 5.75760E−03 | −8.76458E−03 |
| F(14th) | 2.36963E−05 | 1.78565E−04 | 2.86956E−02 | −3.95456E−02 | −2.68191E−03 | 8.44115E−03 |
| G(16th) | −5.04625E−06 | −3.85371E−05 | −1.40529E−02 | 2.19920E−02 | 9.35723E−04 | −5.15022E−03 |
| H(18th) | 7.99797E−07 | 5.96553E−06 | 4.94548E−03 | −8.83462E−03 | −2.74139E−04 | 2.12500E−03 |
| I(20th) | −9.36806E−08 | −6.67584E−07 | −1.25685E−03 | 2.57062E−03 | 7.50509E−05 | −6.07286E−04 |
| J(22th) | 7.96916E−09 | 5.37987E−08 | 2.28786E−04 | −5.36523E−04 | −1.83567E−05 | 1.20401E−04 |
| K(24th) | −4.77158E−10 | −3.06762E−09 | −2.90972E−05 | 7.82707E−05 | 3.44292E−06 | −1.62497E−05 |
| L(26th) | 1.90173E−11 | 1.18857E−10 | 2.45570E−06 | −7.57538E−06 | −4.31415E−07 | 1.42350E−06 |
| M(28th) | −4.52054E−13 | −2.85269E−12 | −1.23578E−07 | 4.36876E−07 | 3.14331E−08 | −7.29290E−08 |
| N(30th) | 4.84167E−15 | 3.25805E−14 | 2.80647E−09 | −1.13596E−08 | −1.00149E−09 | 1.65719E−09 |

Figure 14A:
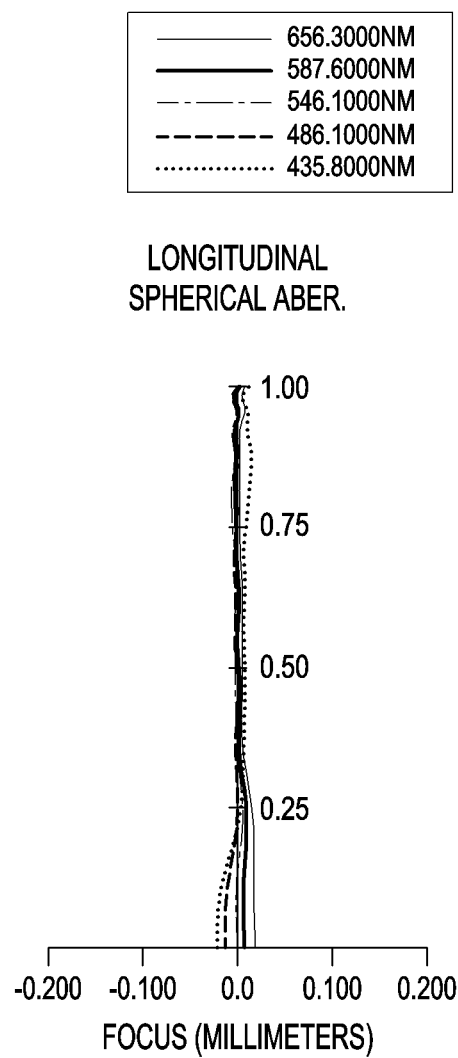
FIG. 14A is a graph illustrating the spherical aberration of the lens assembly of FIG. 13.
Figure 14B:
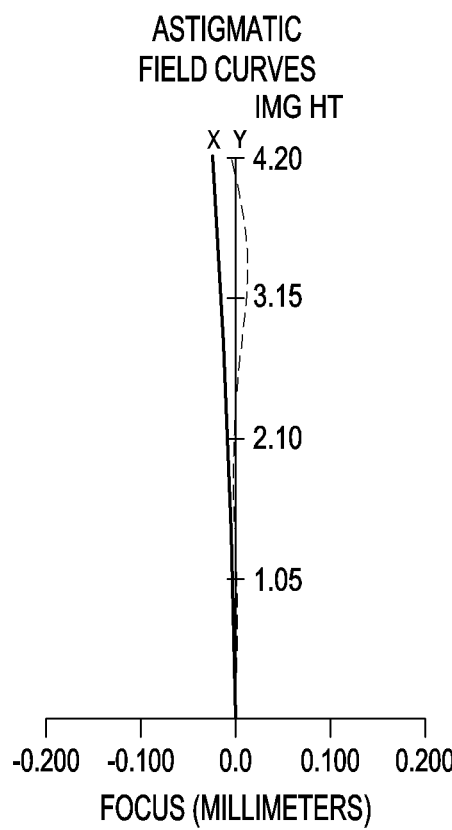
FIG. 14B is a graph illustrating astigmatism of the lens assembly of FIG. 13.
Figure 14C:
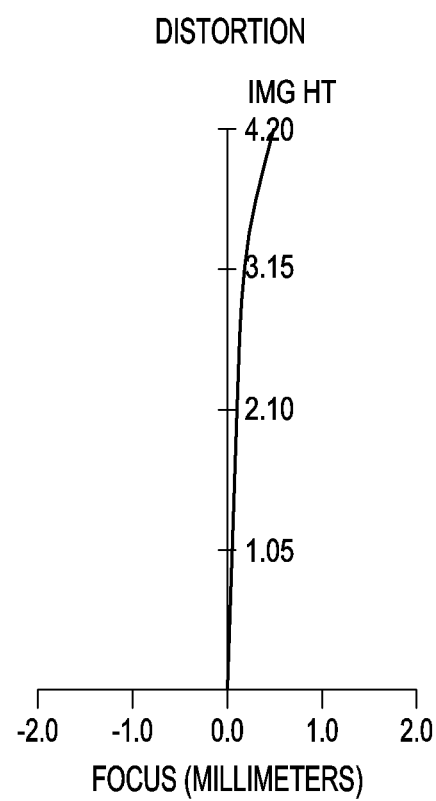
FIG. 14C is a graph illustrating the distortion of the lens assembly of FIG. 13.

FIG. 13 is a view illustrating a configuration of a lens assembly according to an embodiment. FIG. 14A is a graph illustrating the spherical aberration of the lens assembly of FIG. 13. FIG. 14B is a graph illustrating astigmatism of the lens assembly of FIG. 13. FIG. 14C is a graph illustrating the distortion of the lens assembly of FIG. 13.

Referring to FIGS. 13 to 14C, the lens assembly 800 illustrated herein may be different from the embodiment of FIGS. 3A to 4C. The lens assembly 800 may include a plurality of lenses, an image sensor IS, and/or a filter F. Here, the lens assembly according to the embodiment shown in FIGS. 13 to 14C may include 4 lenses. The lens assembly 800 may include a first lens L1, a second lens L2, a third lens L3, and a fourth lens L4. In the lens assembly 800 may include the first lens L1 having a glass material. The lens assembly 800 may include a reflective member M capable of changing the path of the light passing through the fourth lens L4 at least twice or more. The lens assembly 700 may adopt a prism as the reflective member M.

Table 11 below may represent various lens data about the lens assembly 800 according to the embodiment of FIGS. 13 to 14C. In Table 11 below, portions marked with the symbol '*', such as 'S2*, S3*, S4*, S5*, S7*, S8*, and S9*', may indicate the surfaces of lenses to which an aspheric surface is applied. Table 12 below may show data for defining aspheric coefficients of the plurality of lenses, respectively.

TABLE 11

| surface | radius | Thickness (air gap) | EFL | nd | Vd |
|---|---|---|---|---|---|
| obj | infinity | infinity | | | |
| S1 | infinity | 0.00000 | | | |
| S2* | 5.48261 | 2.84135 | 7.015 | 1.49700 | 81.61 |
| S3* | −7.98852 | 0.37953 | | | |
| S4* | −6.83760 | 0.50000 | −4.889 | 1.53662 | 55.78 |
| S5* | 4.39572 | 0.60000 | | | |
| S6(sto) | 6.20476 | 1.33956 | 9.353 | 1.54024 | 50.85 |
| S7* | −25.80366 | 0.35837 | | | |
| S8* | 38.30411 | 1.10226 | −18.279 | 1.56216 | 42.24 |
| S9* | 8.05351 | 2.00000 | | | |
| S10 | infinity | 20.00000 | infinity | 1.48749 | 70.4 |
| S11 | infinity | 0.50000 | | | |
| S12 | infinity | 0.21000 | infinity | 1.51680 | 64.17 |
| S13 | infinity | 0.73316 | | | |
| Img | infinity | 0.00000 | | | |

TABLE 12

| Surf | 2_ASP | 3_ASP | 4_ASP | 5_ASP | 7_ASP | 8_ASP | 9_ASP |
|---|---|---|---|---|---|---|---|
| Radius | 5.48261E+00 | −7.98852E+00 | −6.83760E+00 | 4.39572E+00 | −2.58037E+01 | 3.83041E+01 | 8.05351E+00 |
| K(Conic) | −4.53408E−01 | −1.00000E+00 | −7.01406E+00 | −2.77463E−01 | 5.26440E+01 | −1.00000E+00 | −4.74202E+00 |
| A(4th) | −1.02650E−04 | −6.46186E−03 | −7.71239E−03 | 4.48435E−03 | −1.76410E−02 | −2.06421E−02 | −3.77990E−03 |
| B(6th) | −1.48249E−04 | 5.21285E−03 | 4.19027E−03 | −5.80691E−03 | 1.85540E−02 | 1.87244E−02 | 1.14751E−03 |
| C(8th) | 2.00537E−04 | −1.30695E−03 | −9.90052E−04 | −9.44653E−05 | −3.08713E−03 | −7.75891E−04 | 7.24170E−03 |
| D(10th) | −1.00642E−04 | −1.40627E−04 | 1.32712E−04 | 3.43866E−03 | −7.00782E−03 | −1.30833E−02 | −1.43494E−02 |
| E(12th) | 3.19821E−05 | 2.40472E−04 | −1.06378E−05 | −2.86208E−03 | 6.78055E−03 | 1.28526E−02 | 1.34702E−02 |
| F(14th) | −7.18640E−06 | −9.87788E−05 | 5.08830E−07 | 1.33841E−03 | −3.30502E−03 | −6.81467E−03 | −7.91123E−03 |
| G(16th) | 1.19180E−06 | 2.44542E−05 | −1.35318E−08 | −4.25828E−04 | 1.04878E−03 | 2.37972E−03 | 3.16416E−03 |
| H(18th) | −1.47952E−07 | −4.13859E−06 | 1.55012E−10 | 9.77739E−05 | −2.32487E−04 | −5.80469E−04 | −8.88706E−04 |
| I(20th) | 1.37048E−08 | 4.96472E−07 | 0.00000E+00 | −1.64753E−05 | 3.68006E−05 | 1.00501E−04 | 1.75895E−04 |
| J(22th) | −9.31312E−10 | −4.23557E−08 | 0.00000E+00 | 2.02489E−06 | −4.15041E−06 | −1.22520E−05 | −2.40725E−05 |
| K(24th) | 4.49389E−11 | 2.51834E−09 | 0.00000E+00 | −1.76811E−07 | 3.25949E−07 | 1.01961E−06 | 2.17079E−06 |
| L(26th) | −1.45332E−12 | −9.92988E−11 | 0.00000E+00 | 1.03911E−08 | −1.69359E−08 | −5.43076E−08 | −1.16132E−07 |
| M(28th) | 2.81698E−14 | 2.33475E−12 | 0.00000E+00 | −3.68296E−10 | 5.22969E−10 | 1.62157E−09 | 2.79312E−09 |
| N(30th) | −2.46843E−16 | −2.47801E−14 | 0.00000E+00 | 5.94335E−12 | −7.26024E−12 | −1.93685E−11 | 0.00000E+00 |

In the above-described embodiments, in the lens assemblies 300, 400, 500, 600, 700 and 800 and/or the electronic device 101 including the lens assemblies, various types of data on the lenses may be identified. These data may satisfy the results of the above conditions.

TABLE 13

| | BFL/ EFL | OTTL/ EFL | EFL/ EFL1 | EFL/ L1LL | L1S3/ L1S2 | BFL/ L1LL | \conversion focal length(mm) |
|---|---|---|---|---|---|---|---|
| embodiment 1 | 1.01 | 1.36 | 3.09 | 2.79 | −1.65 | 2.81 | 94 |
| embodiment 2 | 0.69 | 0.94 | 3.22 | 3.90 | −3.54 | 2.68 | 123 |
| embodiment 3 | 0.93 | 1.27 | 2.89 | 2.92 | −2.17 | 2.71 | 102 |
| embodiment 4 | 0.93 | 1.27 | 2.88 | 2.89 | −2.15 | 2.69 | 143 |
| embodiment 5 | 0.87 | 1.20 | 3.03 | 3.05 | −2.77 | 2.66 | 108 |
| embodiment 6 | 0.87 | 1.13 | 3.85 | 3.79 | −1.46 | 3.29 | 139 |

The lens assembly 800 included in Table 11 below may relate to a telephoto lens having a field of view (FOV) of 17.6 degrees. Further, when the total focal length (EFL) is 27.000 mm, the F number (Fno) is about 3.649, and the optical total length from imaging plane (OTTL) is 30.564 mm, the lens assembly 800 included in Table 11 may satisfy the above-described conditions (and/or at least one of the above-described conditions).

In Table 13 above, 'embodiment 1,' 'embodiment 2,' 'embodiment 3,' and 'embodiment 4' may mean the lens assembly 300 of FIG. 3A, the lens assembly 400 of FIG. 5, the lens assembly 500 of FIG. 7, the lens assembly 600 of FIG. 9, the lens assembly 700 of FIG. 11, and the lens assembly 800 of FIG. 13, respectively. Embodiment 1, embodiment 3, embodiment 4, embodiment 5 and embodiment 6 may use a prism as the reflective member, and embodiment 2 may use a mirror as the reflective member. 'BFL/EFL' may denote conditional equation 1 above, 'OTTL/EFL' conditional equation 3 above, 'EFL/EFL1' conditional equation 4 above, 'EFL/L1LL' conditional equation 5 above, 'L1S3/L1S2' conditional equation 6 above, and 'BFL/L1LL' conditional equation 7 above. For reference, conditional equation 2 is an equation representing the field of view of the lens assembly of the disclosure and is omitted from Table 13.

The above-described lens assembly may be equipped in an electronic device (e.g., an optical device). In addition to the image sensor, the electronic device (e.g., an optical device) may further include an application processor (AP) and drive an operating system (OS) or application programs through the application processor (AP) to thereby control multiple hardware or software components connected with the AP 21 and to perform processing and computation on various data. For example, the application processor (AP) may further include a graphic processing unit (GPU) and/or an image signal processor. When the application processor (AP) includes an image signal processor, the image (or video) obtained by the image sensor IS may be stored or output by way of the application processor.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment of the disclosure, an electronic device 101 may include a lens assembly 210; 300; 400; 500; 600; 700; 800 in which at least four lenses are aligned along an optical axis O-I direction from an object O side to an image I side; an image sensor IS including an imaging plane "img" on which an image is formed; and at least one reflective member M disposed between the lens assembly and the image sensor. At least one surface of an object-side surface S2 and an image-side surface S3 of a first lens L1 from an object side among the at least four lenses may be formed as an aspherical surface. The object-side surface and the image-side surface may be formed to be convex. In this case, the electronic device may satisfy conditional equation 1 and conditional equation 2 below.

$$0.6 < BFL/EFL < 1.1 \quad \text{[conditional equation 1]}$$

$$15 < FOV < 35 \quad \text{[conditional equation 2]}$$

(wherein, in conditional equation 1, BFL is a distance from an image-side surface of a lens closest to the imaging plane to the image sensor, and EFL is a total focal length of the lens assembly and, in conditional equation 2, FOV is a field of view of an overall optical system including the lens assembly.

According to an embodiment, the reflective member may be configured to change a path of light at least twice.

According to an embodiment, at least two or more reflective members may be provided between the lens assembly and the image sensor.

According to an embodiment, a path of a chief ray passing through the reflective member may be parallel to a chief ray incident on the lens assembly.

According to an embodiment, the electronic device may satisfy conditional equation 3 below.

$$0.8 < OTTL/EFL < 1.4 \quad \text{[conditional equation 3]}$$

(wherein, in conditional equation 3, OTTL is a distance from an apex of the object-side surface of the first lens from the object side to the image sensor, and EFL is the total focal length of the lens assembly).

According to an embodiment, the electronic device may satisfy conditional equation 4 below.

$$2.5 < EFL/EFL1 < 3.4 \quad \text{[conditional equation 4]}$$

(wherein, in conditional equation 4, EFL is the total focal length of the lens assembly, and EFL1 is a focal length of the first lens from the object side).

According to an embodiment, the reflective member may be a mirror or a prism.

According to an embodiment, the electronic device may satisfy conditional equation 5 below.

$$2.5 < EFL/L1LL < 4.2 \quad \text{[conditional equation 5]}$$

(wherein, in conditional equation 5, EFL is the total focal length of the lens assembly, and L1LL is a distance from an apex of the object-side surface of the first lens from the object side to an apex of an image-side surface of a lens closest to the image side).

According to an embodiment, an image height IMG HT of the image sensor may have a size of 4.0 mm or more.

(wherein, the image IMG HT of the image sensor may correspond to half of a diagonal length of the image sensor).

According to an embodiment, the first lens from the object side among the plurality of lenses included in the lens assembly may have a positive refractive power, and a second lens from the object side among the plurality of lenses included in the lens assembly may have a negative refractive power.

According to an embodiment, the electronic device may satisfy conditional equation 6 below.

$$-4.5 < L1S3/L1S2 < -0.6 \quad \text{[conditional equation 6]}$$

(wherein, in conditional equation 6, L1S3 is a curvature of the image-side surface of the first lens from the object side, and L1S2 is a curvature of the object-side surface of the first lens from the object side).

According to an embodiment, the stop "sto" may be disposed between the second lens from the object side and the third lens from the object side of the lens assembly.

According to an embodiment of the disclosure, an electronic device 101 may include a lens assembly 210; 300; 400; 500; 600; 700; 800 in which at least four lenses are aligned along an optical axis direction from an object side to an image side; an image sensor IS including an imaging plane on which an image is formed; and at least one reflective member M disposed between the lens assembly and the image sensor. The at least one reflective member M may include prism or mirror. The at least one reflective member may be configured to change a path of light at least twice. A path of a chief ray passing through the at least one reflective member may be parallel to a chief ray incident on the lens assembly. In this case, the electronic device may satisfy conditional equation 1 and conditional equation 2 below.

$$0.6 < BFL/EFL < 1.1 \quad \text{[conditional equation 1]}$$

$$15 < FOV < 35 \quad \text{[conditional equation 2]}$$

(wherein, in conditional equation 1, BFL is a distance from an image-side surface of a lens closest to the imaging plane to the image sensor, and EFL is a total focal length of the lens assembly and, in conditional equation 2, FOV is a field of view of an overall optical system including the lens assembly.

According to an embodiment, at least two or more reflective members may be provided between the lens assembly and the image sensor.

According to an embodiment, the electronic device may satisfy conditional equation 3 below.

$$0.8 < OTTL/EFL < 1.4$$

(wherein, in conditional equation 3, OTTL is a distance from an apex of the object-side surface of the first lens from the object side to the image sensor, and EFL is the total focal length of the lens assembly).

According to an embodiment, the electronic device may satisfy conditional equation 4 below.

$$2.5 < EFL/EFL1 < 4.3 \quad \text{[conditional equation 4]}$$

(wherein, in conditional equation 4, EFL is the total focal length of the lens assembly, and EFL1 is a focal length of the first lens from the object side).

According to an embodiment, the electronic device may satisfy conditional equation 5 below.

$$2.5 < EFL/L1LL < 4.2 \quad \text{[conditional equation 5]}$$

(wherein, in conditional equation 5, EFL is the total focal length of the lens assembly, and L1LL is a distance from an apex of the object-side surface of the first lens from the object side to an apex of an image-side surface of a lens closest to the image side).

According to an embodiment, an image height of the image sensor may be 4.0 mm or more.

(wherein, the image IMG HT of the image sensor may correspond to half of a diagonal length of the image sensor).

According to an embodiment, the electronic device may satisfy conditional equation 6 below.

$$-4.5 < L1S3/L1S2 < -0.6 \quad \text{[conditional equation 6]}$$

(wherein, in conditional equation 6, L1S3 is a curvature of the image-side surface of the first lens from the object side, and L1S2 is a curvature of the object-side surface of the first lens from the object side).

While the present disclosure has been shown and described with reference to example embodiments thereof, it will be apparent to those of ordinary skill in the art that various changes in form and detail may be made thereto without departing from the spirit and scope of the present disclosure as defined by the following claims. For example, in specific embodiments of the disclosure, the measurements of the plurality of lenses may be properly set depending on the structure, specifications, or actual use environment of the lens assembly as actually manufactured or an electronic device equipped with the lens assembly.

What is claimed is:

1. An electronic device, comprising:
a lens assembly including at least four lenses;
an image sensor; and
at least one reflective member disposed between the lens assembly and the image sensor along an optical axis in a direction from an object side to an image side, wherein the reflective member is configured to refract or reflect light at least twice,
wherein the lens assembly includes a first lens from an object-side having a positive refractive power and a second lens from the object-side having a negative refractive power, wherein the object-side surface of the first lens and the image-side surface of the first lens are formed to be convex, and
wherein the electronic device satisfies below:

0.6<BFL/EFL<1.1

15<FOV<35, and wherein, BFL is a "back focal length," indicating distance of a path of the light passing through from an image-side surface of a lens closest to the imaging plane to the image sensor, and EFL is an "effective focal length," indicating a total focal length of the lens assembly and, FOV is a field of view of an overall optical system including the lens assembly.

2. The electronic device of claim 1, wherein the reflective member includes at least two reflective surfaces.

3. The electronic device of claim 1, wherein at least two or more reflective members are disposed between the lens assembly and the image sensor.

4. The electronic device of claim 3, wherein a path of a chief ray passing through the reflective member, is parallel to a path of a chief ray incident on the lens assembly.

5. The electronic device of claim 1, wherein the electronic device satisfies below:

0.8<OTTL/EFL<1.4, and wherein OTTL is an "optical total length from image plane," indicating a distance from an apex of the object-side surface of the first lens from the object side to the image sensor.

6. The electronic device of claim 1 wherein the electronic device satisfies below:

2.5<EFL/EFL1<4.3, and wherein and EFL1 is an effective focal length of the first lens from the object side).

7. The electronic device of claim 1, wherein the reflective member includes a mirror or a prism.

8. The electronic device of claim 1, wherein the electronic device satisfies below:

2.5<EFL/L1LL<4.2, and wherein and L1LL is a distance from an apex of the object-side surface of the first lens from the object side to an apex of an image-side surface of a lens closest to the image side.

9. The electronic device of claim 1, wherein an image height of the image sensor is 4.0 m or more, and wherein, the image height of the image sensor corresponds to half of a diagonal length of the image sensor.

10. The electronic device of claim 1, wherein at least one surface of an object-side surface and an image-side surface of the first lens is formed as an aspherical surface.

11. The electronic device of claim 1, wherein the electronic device satisfies below:

−4.5<L1S3/L1S2<−0.6, and wherein L1S3 is a curvature of the image-side surface of the first lens from the object side, and L1S2 is a curvature of the object-side surface of the first lens from the object side.

12. The electronic device of claim 1, wherein a stop is disposed between a second lens from the object side, and a third lens from the object side of the lens assembly.

13. The electronic device of claim 1, wherein the electronic device satisfies below:

2.1<BFL/L1LL<3.8, and wherein L1LL is a distance from an apex of the object-side surface of the first lens from the object side to an apex of an image-side surface of a lens closest to the image side.

14. The electronic device of claim 1, wherein the first lens from an object side includes a synthetic resin material.

15. The electronic device of claim 1, wherein a second lens (L2) from among the plurality of lenses included in the lens assembly includes a concave object-side surface from the object side thereof.

16. The electronic device of claim 1, wherein the lens assembly includes a third lens from an object-side having a positive refractive power and a fourth lens from an object-side having a negative power.

17. The electronic device of claim 1, wherein a path of a chief ray passing through the reflective member is parallel to a path of a chief ray incident on the lens assembly, wherein the optical axis is bent at least twice.

18. The electronic device of claim 1, wherein the lens assembly includes a third lens from an object-side having a positive refractive power and a fourth lens from an object-side having a negative power.

19. The electronic device of claim 1, wherein the optical axis is bent at least twice.

20. An electronic device, comprising:
a lens assembly in which at least four lenses are aligned along an optical axis in a direction from an object side to an image side;
an image sensor including an imaging plane where an image is formed; and
at least one reflective member disposed between the lens assembly and the image sensor,
wherein the at least one reflective member is configured to change a path of light at least twice,
wherein the lens assembly includes a first lens from an object-side having a positive refractive power and a second lens from the object-side having a negative refractive power,
wherein the object-side surface of the first lens and the image-side surface of the first lens are formed to be convex, and wherein the electronic device satisfies below:

0.8<OTTL/EFL<1.4 wherein, OTTL is an "optical total length from image plane", indicating a distance of a path of the light passing through from an apex of the object-side surface of the first lens from the object side to the image sensor and EFL is a total focal length of the lens assembly.

* * * * *